United States Patent [19]
Eki et al.

[11] Patent Number: 5,846,390
[45] Date of Patent: Dec. 8, 1998

[54] NON-MEMBRANE WATER ELECTROLYZER

[75] Inventors: Toshio Eki; Toshiharu Otsuka; Takafumi Oshima; Akemi Kuroda, all of Kita-kyushu, Japan

[73] Assignee: Toto Ltd., Fukuoka, Japan

[21] Appl. No.: 765,201

[22] PCT Filed: Jun. 30, 1995

[86] PCT No.: PCT/JP95/01312

§ 371 Date: Jan. 3, 1997

§ 102(e) Date: Jan. 3, 1997

[87] PCT Pub. No.: WO96/01230

PCT Pub. Date: Jan. 18, 1996

[30] Foreign Application Priority Data

Jul. 6, 1994 [JP] Japan .................................. 6-177487

[51] Int. Cl.⁶ ........................................................ C25B 9/00
[52] U.S. Cl. .................................................................. 204/228
[58] Field of Search ............................................. 204/228

[56] References Cited

U.S. PATENT DOCUMENTS

| | | | |
|---|---|---|---|
| 4,810,344 | 3/1989 | Okazaki | 204/228 |
| 4,867,856 | 9/1989 | Okazaki | 204/228 |
| 5,055,170 | 10/1991 | Saito | 204/228 |
| 5,445,722 | 8/1995 | Yamaquti et al. | 204/228 X |

FOREIGN PATENT DOCUMENTS

| | | |
|---|---|---|
| 51-77584 | 7/1976 | Japan . |
| 55-91996 | 6/1980 | Japan . |
| 59-189871 | 12/1984 | Japan . |
| 1-203097 | 8/1989 | Japan . |
| 4-284889 | 10/1992 | Japan . |
| 5-245473 | 9/1993 | Japan . |
| 5-285482 | 11/1993 | Japan . |
| 5-329478 | 12/1993 | Japan . |

*Primary Examiner*—Donald R. Valentine
*Attorney, Agent, or Firm*—Finnegan, Henderson, Farabow, Garrett & Dunner, L.L.P.

[57] ABSTRACT

An electrolyzer for producing alkaline and/or acidic water by way of electrolysis of water. The electrolyzer (36) comprises a pair of planar electrodes (98; 100; 102) which are arranged opposite to each other without intervening a membrane therebetween. To remove scale such as calcium carbonate deposited during electrolysis on the electrodes (98; 100; 102), an electric potential of a reversed polarity is applied to the electrodes everyday at night and/or at the time when water is fed for the first time in the morning of the following day. During use of the electrolytic cell, the duration of electrolysis in the alkaline water supply mode and the duration of electrolysis in the acidic water supply mode, with a limit of maximum 30 seconds, are cumulated in a countervailing manner. For descaling, an electric potential of the polarity opposite to the polarity of the mode which is operated for a longer period of time is applied to the electrodes. A water electrolyzer can be realized which is capable of prolonging the service life of the electrodes for years while effectively preventing deposition of the scale.

16 Claims, 21 Drawing Sheets

NON-MEMBRANE WATER ELECTROLYZER

This application is a National Stage Application of PCT/JP95/01312, filed Jun. 30, 1995.

TECHNICAL FIELD

The present invention relates to a water electrolyzer for electrochemically producing alkaline and/or acidic water. More specifically, the present invention is concerned with an electrolyzer of the non-membrane type wherein water is subjected to electrolysis while effectively removing scales, such as calcium carbonate, deposited on electrodes.

BACKGROUND ART

It is believed that hydroxyl ion ($OH^-$) enriched alkaline water, which is often incorrectly referred-to as "alkaline ion water", is useful in health maintenance when served as potable water as well as in accentuating taste when used in cooking or for the preparation of beverages such as tea and coffee. Similarly, hydrogen ion ($H^+$) enriched acidic water is known as being suitable for boiling noodles and washing faces. More importantly, highly acidic water which is obtained by electrolysis of tap water containing sodium chloride or an aqueous solution of sodium chloride and which therefore contains effective chlorine (hypochlorous acid or chlorine gas) has been noted as having a strong germicidal effect.

To produce alkaline and/or acidic water, an apparatus for electrolyzing water has been used hitherto which is often incorrectly referred-to in the art as "ion water generator". This apparatus, designed to subject water to electrolysis, includes an electrolytic cell having an anode and a cathode. As a direct electric potential is applied between the electrodes, the hydroxyl ions $OH^-$ being present in water due to electrolytic dissociation of water molecules will donate electrons to the anode at the anode-water interface and are thereby oxidized to form oxygen gas which is then removed away from the system. As a result, the $H^+$concentration is enhanced at the anode-water interface so that $H^+$enriched acidic water is resulted at the anode-water interface. At the cathode-water interface, on the other hand, $H^+$accepts electron from the cathode and is reduced to hydrogen to form hydrogen gas which is similarly eliminated from the system. As a result, the $OH^-$concentration is increased whereby $OH^-$enriched alkaline water is generated at the cathode side. When an aqueous solution of sodium chloride is subjected to electrolysis, chlorine gas is generated at the anode and is dissolved into water to form hypochlorous acid.

To preclude alkaline water and acidic water once generated by electrolysis from being mixed with each other and to take them out separately, the conventional electrolytic cells are typically provided with a water-impermeable but ion-permeable membrane 3 arranged between an anode plate 1 and a cathode plate 2 as schematically shown in FIG. 1, the electrolytic chamber being divided by the membrane into a flowpath 4 for alkaline water and a flowpath 5 for acidic water. The electrolytic cell of this type will be referred-to hereinafter as the "membrane-type" electrolytic cell.

As the electrolytic cell is operated, precipitation of scale 6 comprised of calcium carbonate, calcium hydroxide, magnesium hydroxide and the like takes place in the flowpath for alkaline water. Referring to FIG. 2 wherein the apparent solubility of calcium carbonate versus pH is shown, the mechanism of scale precipitation will be described with reference to calcium hydroxide by way of an example. It will be noted from the graph that under acid conditions, calcium carbonate is dissolved into water in the form of calcium ions. However, as the pH exceeds 8, the solubility is rapidly drops thereby giving rise to precipitation of calcium carbonate. In the electrolytic cell of the membrane type, the scale tends to precipitate predominantly on the membrane 3 rather than on the cathode 2, as shown in FIG. 1. Probably, this is because the porous nature of the membrane promotes precipitation of scale, in contrast to the cathode generally having a polished specular surface. Since the precipitates such as calcium carbonate are electrically insulating, the electrical resistance across the cell is increased thereby lowering the efficiency of electrolysis of the cell. In addition, formation of scale increases the flow resistance across the electrolytic cell. Therefore, unless the scale is removed, the electrolytic cell would become inoperative soon after a short period of use.

Accordingly, there has been proposed in the prior art to remove the precipitates by dissolving them into water as disclosed, for example, in Japanese Patent Kokai Publication 51-77584, Japanese Utility Model Kokai Publication 55-91996, Japanese Utility Model Kokai Publication 59-189871, and Japanese Patent Kokai Publication 1-203097. According to this method, a polarity reversal switch 7 is turned over in such a manner that an electric potential of an polarity opposite to the normal operating polarity is applied between the electrodes to thereby cause the precipitates to dissolve. This method is known in the art as "reverse potential descaling" or "reverse electrolysis descaling" process. The principle of reverse electrolysis descaling is that, upon application of electric potential of the opposite polarity, the flowpath for the alkaline water is changed into acidic conditions whereby the scale such as calcium carbonate is disintegrated into ions to again dissolve into water as will be understood from FIG. 2.

However, since the membrane 3 is more or less spaced from the electrodes as will be understood from FIG. 1, the stream of strongly acidic water which has been generated along the surface of the electrode 2 (originally acting as the cathode, but now acting as the anode because the polarity of potential is reversed) will be carried away by the flow of water flowing through the flowpath so that strongly acidic water could not reach the membrane as long as it is present in moving water. Therefore, the membrane cannot be rendered acidic to a degree strong enough to quickly dissolve the scale deposited on the membrane.

For this reasons, in the "membrane-type" electrolytic cell, it has been difficult to electrochemically remove the scale even though the so-called reverse electrolysis descaling is carried out. Accordingly, it has been usual that the life of the electrolytic cells is only from a half to one year unless the cells are periodically disassembled and are subjected to manual mechanical descaling operations. Furthermore, the membrane is unhygienic since it serves as breeding bed for bacteria.

In order to overcome the foregoing disadvantages of the membrane-type electrolytic cell, proposed in Japanese Patent Kokai Publication 4-284889 is an electrolytic cell which is free from a membrane. The electrolytic cell of this type will be referred-to hereinafter as the "non-membrane" type electrolytic cell. In the non-membrane type cell, the electrode plates are spaced from one another with a small gap in such a manner that a laminar flow is established as water flows between the electrodes. Therefore, alkaline water and acidic water as generated can be separated from each other without recourse to a membrane.

As the non-membrane type electrolytic cell is not provided with a membrane which is susceptible to deposition of scale, there is an advantage that less scale is deposited. The formation of scale takes place primarily on the cathode plate. Moreover, the cell is hygienic because of the absence of a membrane which would otherwise breed bacteria.

The "non-membrane" electrolytic cell of JP 4-284889 is also designed such that the reverse polarity potential is applied to carry out the so-called reverse electrolysis descaling in a manner similar to the conventional membrane-type electrolytic cells.

However, to frequently apply the reverse polarity potential for the purpose of descaling is undesirable because the service life of the electrodes is seriously shortened. More specifically, the cathode is generally made of platinum coated titanium plate. During the course of ordinary electrolysis, the surface of the platinum coating is covered by a layer or film of platinum oxide formed thereon. The layer of platinum oxide is stable as long as a minus voltage is applied to the cathode. However, upon application of a plus voltage to the cathode for the purpose of reverse electrolysis descaling, platinum oxide is reduced into platinum whereupon it partly dissolves into water in the form of platinum ions. If chlorine ions are present in water, platinum ions will react therewith to form highly soluble platinum chloride which will then readily dissolve into water. Therefore, the cathode plate is exhausted and damaged each time the reverse polarity potential is applied. In the case where the cathode is made from titanium plate without platinum coating or from a metal other than platinum, exhaustion of the cathode resulting from the reverse polarity potential application would be more significant.

In this manner, to increase the frequency of reverse voltage application in order to perfectly remove the scale will result in premature exhaustion of the electrode plates. If to the contrary the frequency of reverse voltage application is to be limited, the electrolytic cell will soon become unusable due to deposition of scale. In any case, according to the conventional methods, it was therefore impossible to prolong the overall service life of the electrolytic cell beyond a period on the order of years.

Another disadvantage is that, in a situation wherein during the previous electrolysis the electrolytic cell has been operated, for example, in the alkaline water supply mode whereas during the electrolysis immediately preceding the previous electrolysis the cell has been operated in the acidic water supply mode, and provided that the duration of the acidic water supply mode during the electrolysis immediately preceding the previous electrolysis is longer than the duration of the alkaline water supply mode during the previous electrolysis, the accumulation of scale would rather be promoted if the reverse potential descaling were carried out in a polarity opposite to that applied during the previous electrolysis performed in the alkaline water supply mode.

An object of the invention is to provide a water electrolyzer which permit use of an electrolytic cell for as a long period as several years and which, hence, are capable of extending the overall life of the cell.

Another object of the invention is to provide a water electrolyzer wherein alkaline and/or acidic water is produced while effectively removing the scale and which are capable of extending the life of the electrodes.

DISCLOSURE OF THE INVENTION

The present invention is based on the finding that, in the case where the electrolytic cell has been operated firstly in the alkaline water supply mode and then in the acidic water supply mode, or vice versa, the reverse potential descaling of the electrodes of the electrolytic cell has already been done automatically and intrinsically, provided that the operation in the latter mode has been continued for at least 10 seconds, preferably for about 30 seconds.

Accordingly, the present invention provides a water electrolyzer having an electrolytic cell of the non-membrane type wherein the duration of electrolysis in the alkaline water supply mode and the duration of electrolysis in the acidic water supply mode are cumulated in a countervailing manner so as to detect which of the alkaline water supply mode and the acidic water supply mode has been used for a longer period of time within the latest period of operation of about 10 seconds, preferably about 30 seconds and wherein a DC potential of a polarity opposite to the polarity of the longer-used mode is applied between the electrodes. Preferably, the application of the reverse potential is carried out at least once everyday at midnight, or in the morning when water is fed for the first time, for a period of from about 10 seconds to about 10 minutes, preferably about 30 seconds.

According to the invention, the reverse potential descaling can be carried out ideally because the duration of electrolysis in the alkaline water supply mode and the duration of electrolysis in the acidic water supply mode are countervailed and since the reverse potential descaling is effected in this manner in a polarity opposite to the polarity of the latest mode which was used lastly for more than 30 seconds (in the event that the duration of operation of the latest mode is less than 30 seconds, in a polarity opposite to the polarity of the mode prevailing in the latest 30 seconds). Accordingly, it will suffice that the reverse potential descaling is carried out at a cycle of once everyday so that the frequency of reverse potential application may be minimized. As a result, the service life of the electrodes is extended for years while effectively removing the scale.

These features and advantages of the invention as well as other features and advantages thereof will become apparent from the following description.

Best Mode for Carrying Out the Invention

The present invention will now be described in more detail with reference to the accompanying drawings showing an embodiment of the invention.

Figure 1:
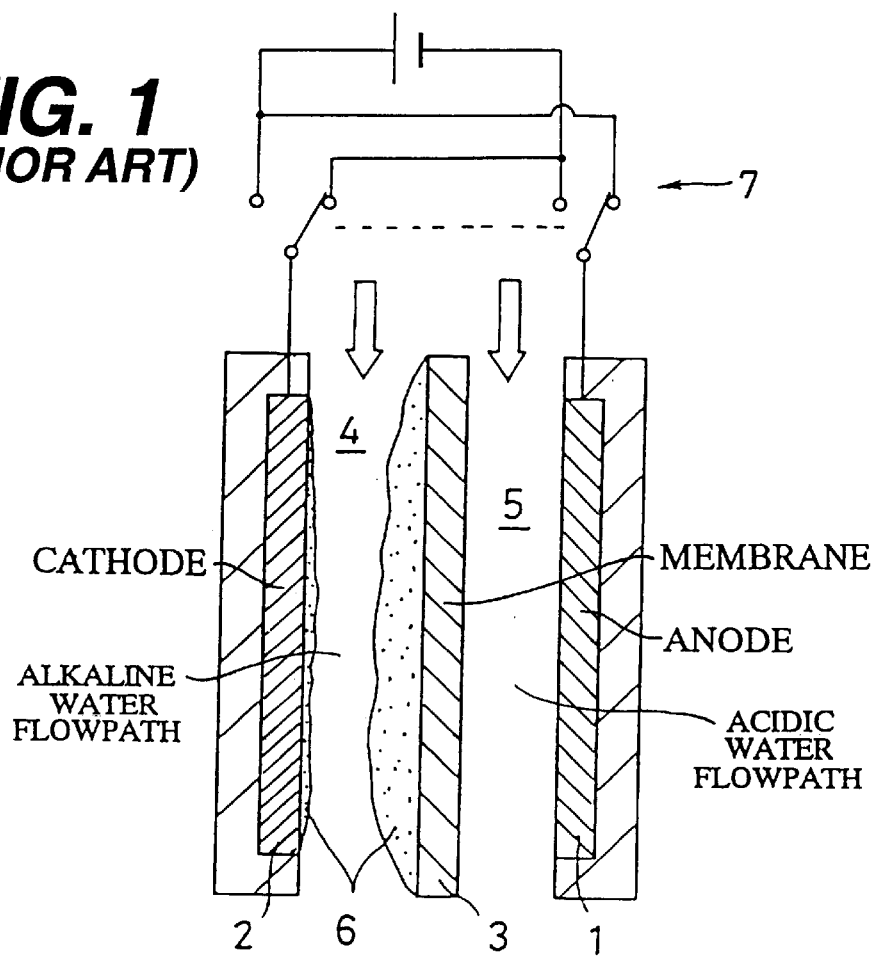
FIG. 1 is a schematic cross-sectional representation of the conventional membrane-type electrolytic cell.
Figure 2:
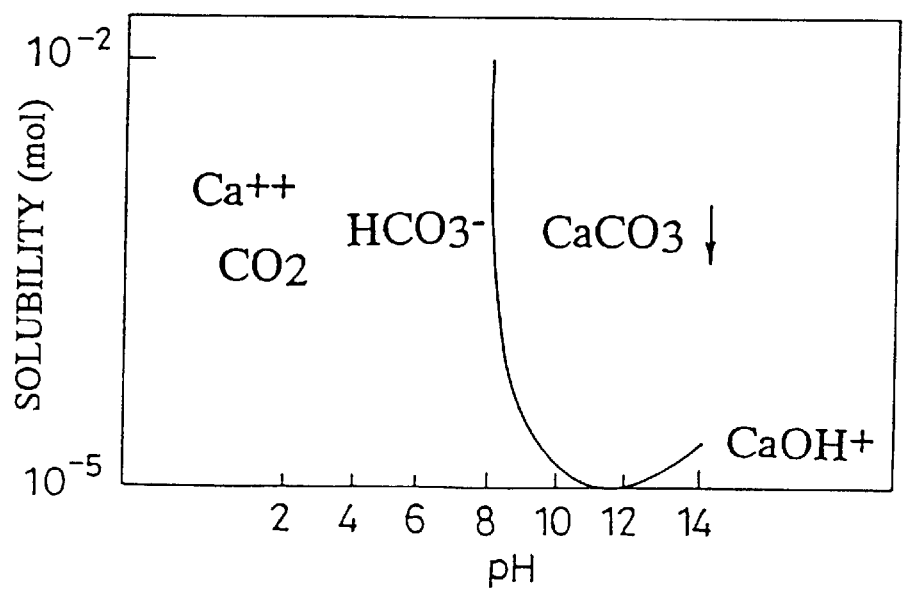
FIG. 2 is a graph showing the apparent solubility of calcium carbonate versus pH.
Figure 3:
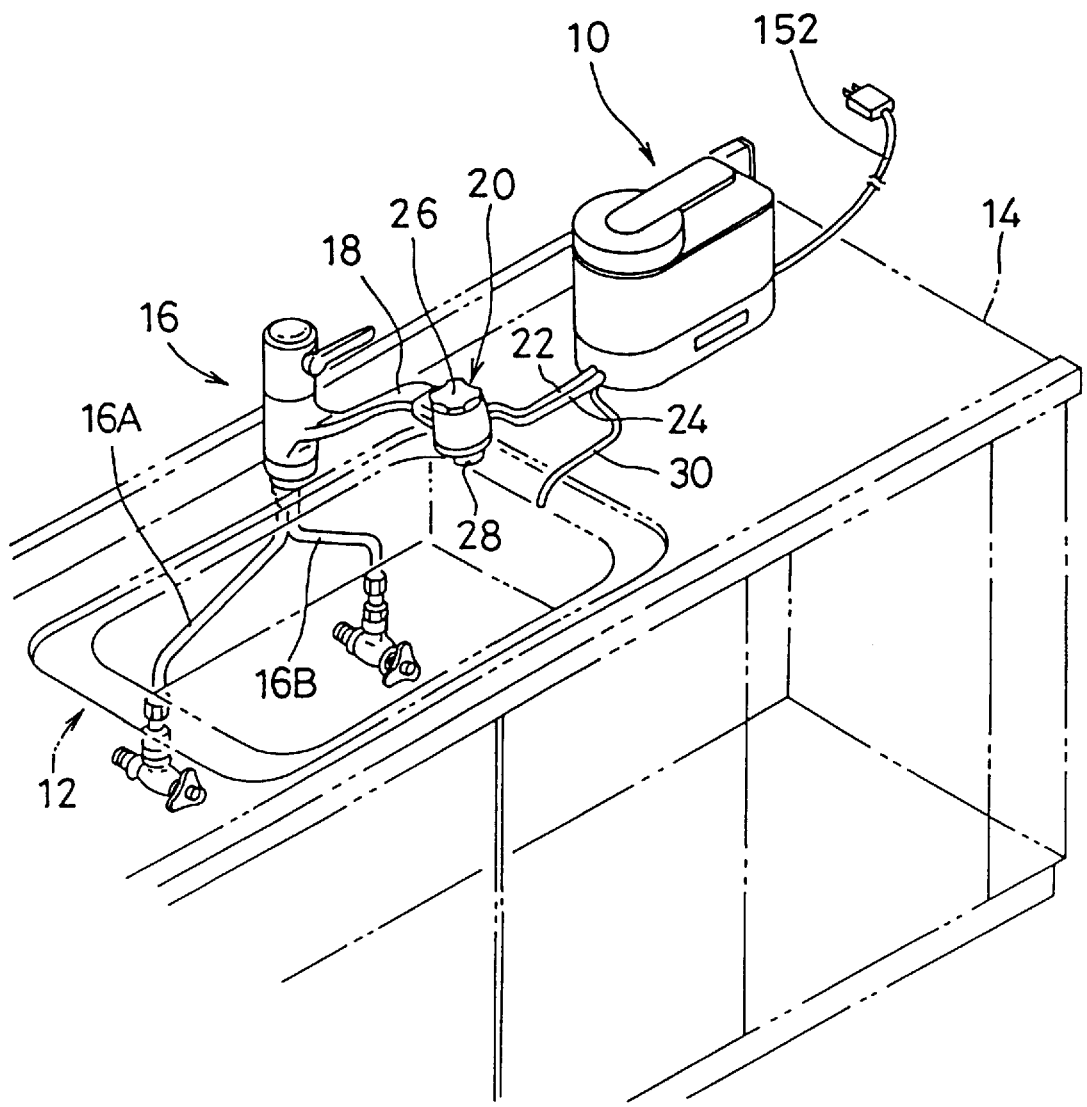
FIG. 3 is a perspective view showing an example of a water processing unit wherein the water electrolyzer according to the invention is incorporated.

In FIG. 3, there is shown a water electrolyzer embodying the invention as incorporated in a water purifier for home use. Referring to FIG. 3, the water processing unit 10 is designed for use as it is placed, for example, on a kitchen counter 14 equipped with a sink 12.

In the illustrated layout, the sink is provided with a mixing valve 16 of the single-lever type to which hot water from a boiler (not shown) is supplied via a hot water piping 16A and tap water is applied through a water piping 16B connected to the public water line (not shown).

Spout 18 of the mixing valve 16 is provided with a faucet adapter 20 wherein a flow control valve mechanism is arranged, the adapter 20 being connected to the processing unit 10 through a tap water supply hose 22 and a processed water delivery hose 24. Upon rotating a handle 26 of the adapter 20 into a predetermined angular position, tap water from the mixing valve 16 will be forwarded through the supply hose 22 to the processing unit 10 and water after treatment will be returned via the delivery hose 24 to the adapter 20 for delivery through an outlet 28. Upon turning the handle 26 into another position, non processed water or a mixture thereof with hot water coming from the mixing valve 16 will be directly delivered from the outlet 28 of the adapter 20 upon bypassing the processing unit 10.

Connected further to the processing unit 10 is a drain hose 30 which is adapted to discharge to the sink 12 waste water, hot water and steam occurred or generated in the processing unit 10.

Figure 4:
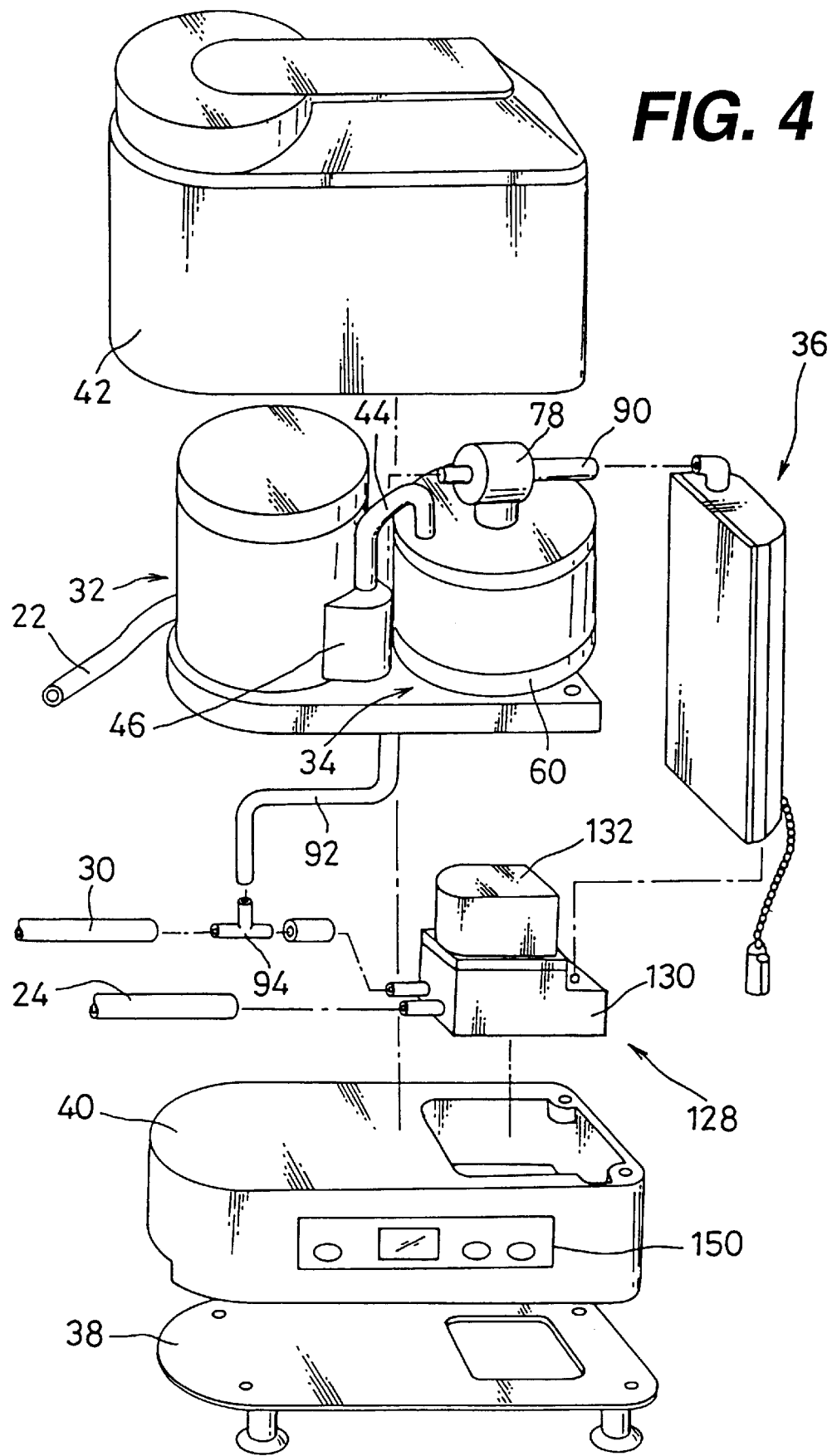
FIG. 4 is an exploded perspective view of the unit shown in FIG. 3.

Referring to FIG. 4, the water processing unit 10 is designed and constructed such that any particulate matters, such as ferrous rust and microorganisms, which are born in tap water are first removed by filtration, that any harmful or undesirable substances such as residual chlorine, trihalomethanes and smelly substances which are dissolved in tap water are then removed under the adsorption action of activated carbon, and that the thus purified water is further subjected to electrolysis to produce acidic and/or alkaline water at the user's discretion.

To this end, the water processing unit 10 is comprised of a filtration stage 32 wherein a filter (not shown) such as hollow-fiber membrane filter is received, an adsorption stage including an activated carbon cartridge 34 wherein fibrous or granular activated carbon is received, and an electrolytic cell 36 for generating acidic or alkaline water. These components parts of the water processing unit are supported by a base 40 having a bottom plate 38 and are enclosed by an outer casing 42.

Tap water from the mixing valve 16 is forwarded via the supply hose 22 to the filtration stage 32, with filtered water being delivered through a hose 44 to the activated carbon cartridge 34. A conventional flow-rate sensor 46 is arranged at the outlet of the filtration stage 32 to detect the flow rate of water flowing through the water processing unit 10. The flow rate sensor 46 is also used to detect the presence or absence of water feed to the processing unit 10 and, therefore, may be arranged in any other suitable location or may be replaced by a pressure sensor or pressure switch.

Figure 5:
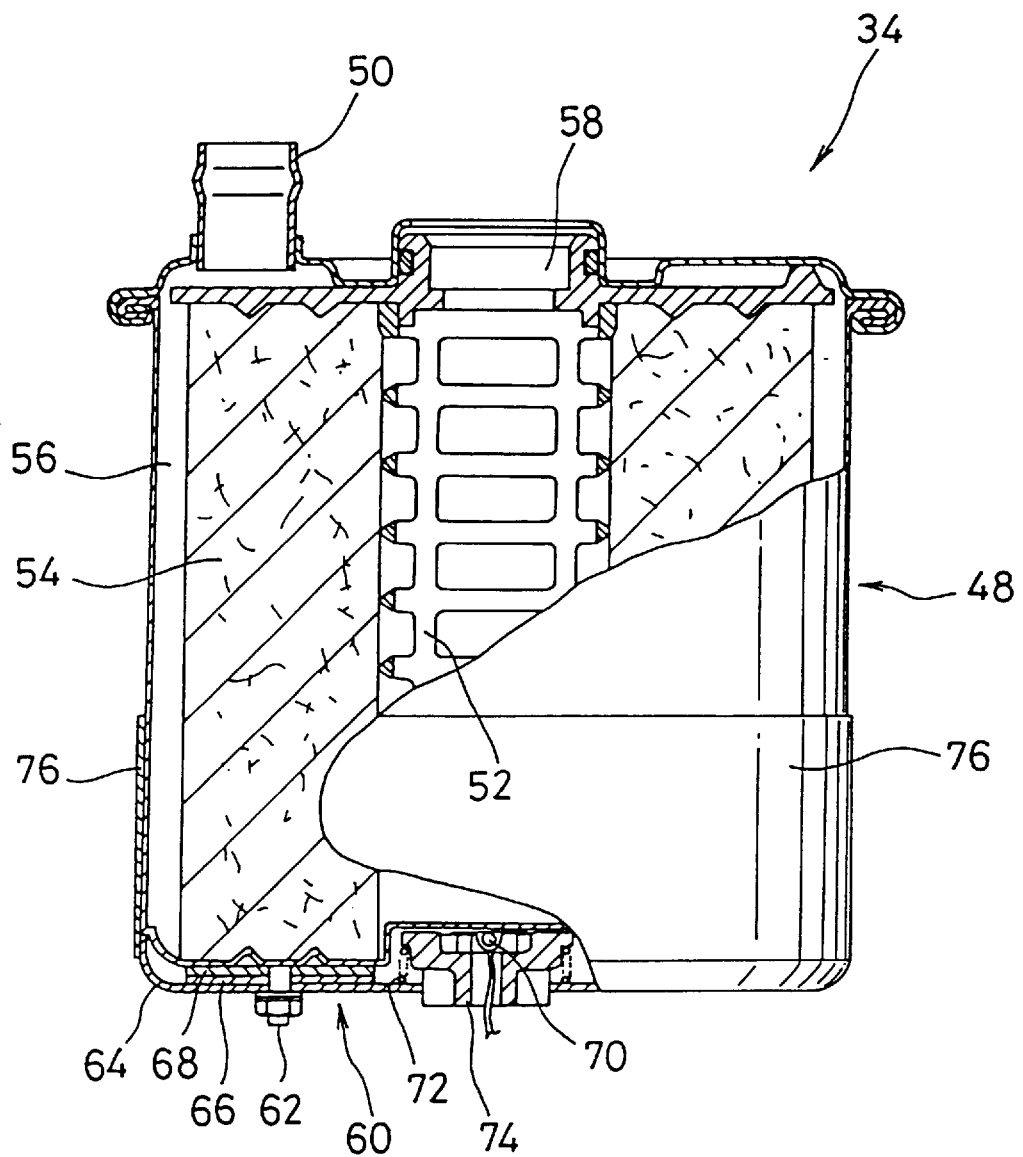
FIG. 5 is a cross-sectional view, partly cut away, of an activated carbon cartridge of the unit shown in FIG. 4.

As shown in FIG. 5, the activated carbon cartridge 34 includes a container 48 made by curling of stainless steel sheet and is provided with an inlet 50 to which the hose 44 is connected. Arranged at the center of the container 48 is a core frame 52 in the form of a skeleton, around which is fixed an activated carbon element 54 made by mold forming of activated carbon fibers bound by a heat-resistive binder. Tap water as entered from the inlet 50 into the cartridge 34 will be distributed over an annular space 56 and will be purified as it flows across the element 54 and will be delivered out of an outlet 58 of the container.

The activated carbon cartridge 34 is designed to be heated at a desired timing whereupon the activated carbon element 54 is boiled and sterilized, and chlorine and trihalomethanes adsorbed by the element are desorbed whereby activated carbon is regenerated. To this end, the cartridge 34 is provided with an electric heater 60 fixed to the bottom thereof to ensure that the cartridge 34 is heated at its bottom when the heater is energized. A plurality of screws 62 are welded or soldered to the bottom plate of the container 48 and the heater 60 is fastened thereto by nuts. The heater 60 may be comprised of a cup-shaped metallic heat radiator plate 64 and a heat generation member 66 which may be a sheathed heater or a mica heater wherein nichrome wires are interleaved between mica foils. Preferably, a heat transfer aluminum plate 68 is sandwiched between the heated member 66 and the bottom of the container to ensure that heat of the heated member is conveyed well to the container.

The container 48 has at its center a raised bottom portion to which a thermistor 70 is brought into thermal contact in order to detect the temperature of the raised bottom portion. The thermistor 70 is held into resilient contact with the central raised bottom portion by a thermistor holder 74 which, in turn, is supported through a coil spring 72 by the heat radiator plate 64. Preferably, an aluminum foil adhesive tape 76 is affixed over the juncture of the container 48 and the heat radiator plate 64 to ensure that heat of the heater is transferred well to the activated carbon cartridge 34.

Referring to FIG. 4, a direction control valve 78 is arranged at the outlet 58 of the cartridge 34 so as to discharge hot water and steam generated during regeneration of activated carbon through the drain hose 30 toward the sink 12. The direction control valve 78 is of the temperature responsive type and is so designed that the outlet thereof is automatically switched over in response to the temperature of hot water and steam issuing from the cartridge 34.

Figure 6:
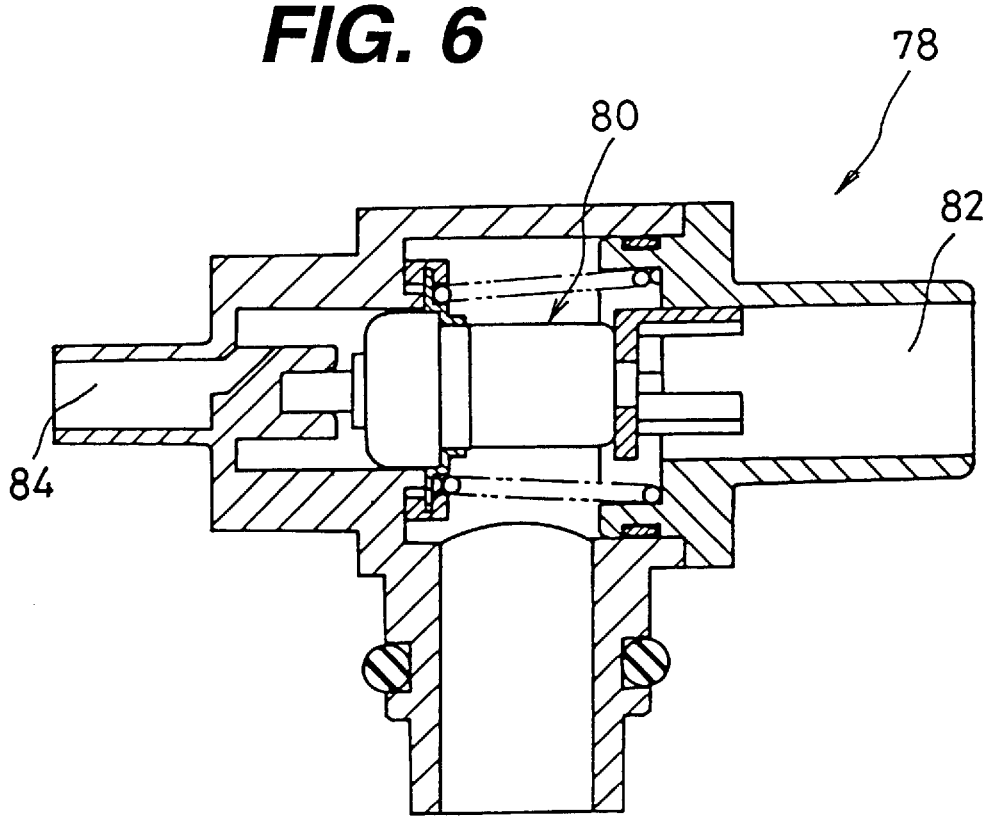
FIG. 6 is a cross-sectional view of a temperature-responsive direction control valve of the unit shown in FIG. 4.
Figure 7:
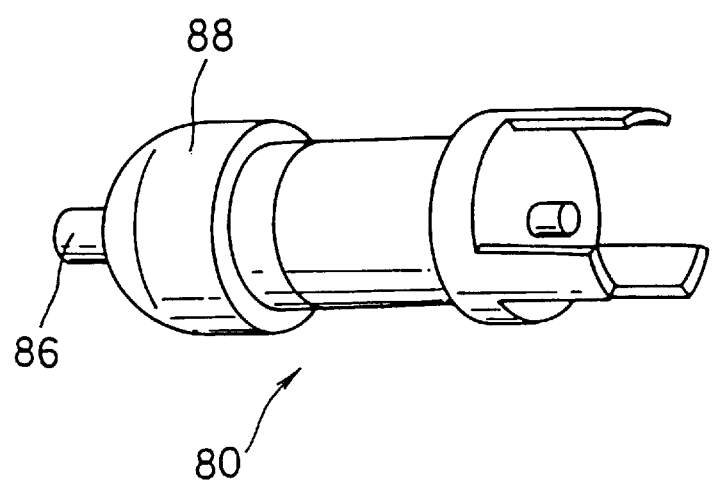
FIG. 7 is a perspective view of a portion of the temperature responsive direction control valve shown in FIG. 6.

As shown in FIGS. 6 and 7, the direction control valve 78 includes a movable member 80 incorporating a temperature responsive element made of a thermally expansive wax composition, an outlet 82 for purified water and an outlet 84 for hot water. The direction control valve 78 is designed such that in response to a rise in the ambient temperature a spindle 86 is protruded to move a valve member 88 to the right as viewed in FIG. 6 to thereby permit hot water and steam coming from the cartridge 34 to issue toward the hot water outlet 84. The direction control valve 78 may be adjusted in such a manner that fluid flow is directed to the purified water outlet 82 when the ambient temperature is less than 60° C. but is forwarded to the hot water outlet 84 when the ambient temperature exceeds 60° C.

As shown in FIG. 4, the purified water outlet 82 of the direction control valve 78 is connected through a hose 90 to the electrolytic cell 36, with the hot water outlet 84 being connected through a hot water drainage hose 92 and a T-joint 94 to the drain hose 30.

When the water processing unit 10 is operated, purified water issuing from the activated carbon cartridge 34 is forwarded to the electrolytic cell 36. Referring to FIGS. 8–13, an embodiment of the electrolytic cell 36 will be described by way of an example.

Figure 8:
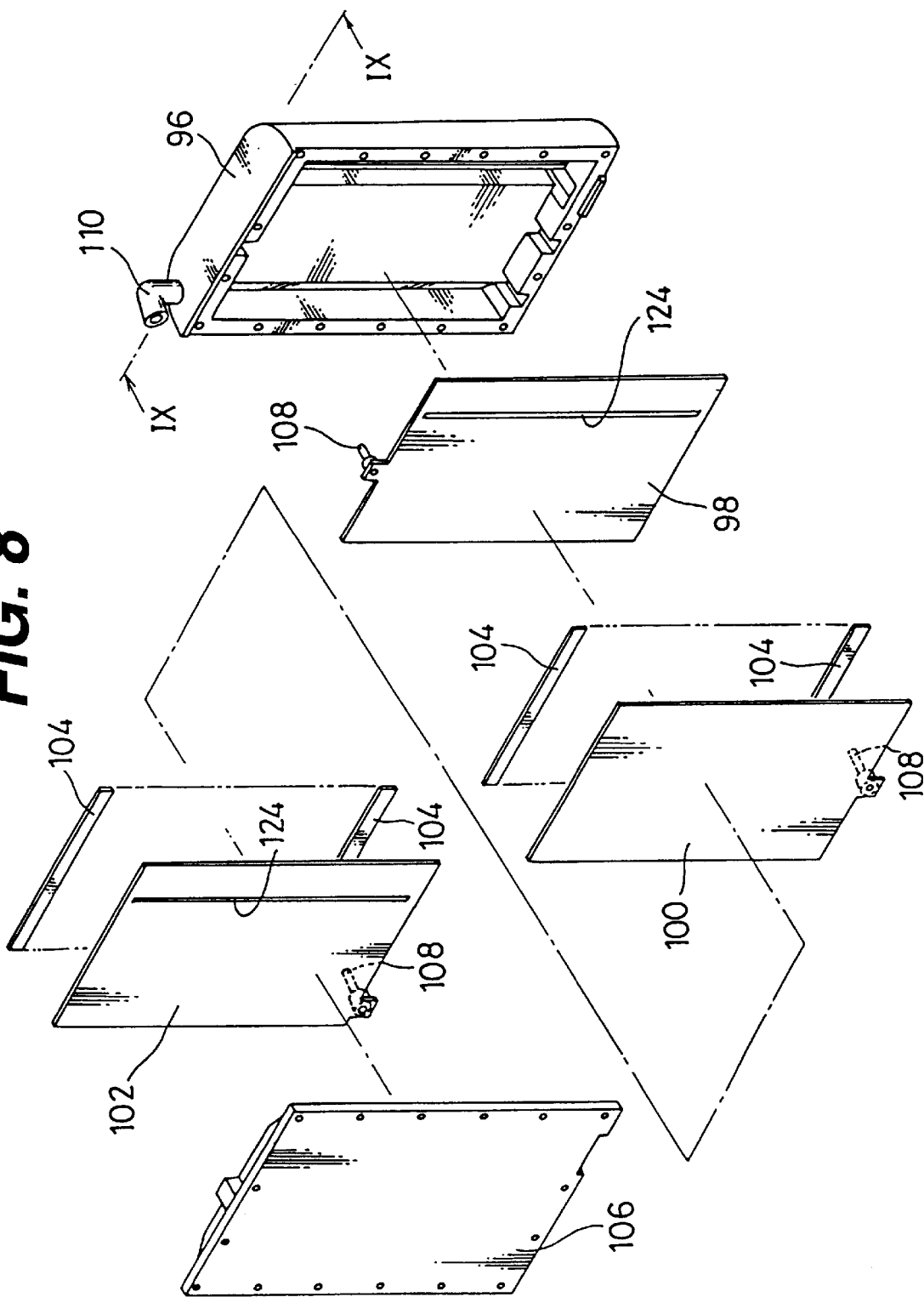
FIG. 8 is an exploded perspective view of the electrolytic cell shown in FIG. 4.

As shown therein, the electrolytic cell 36 is of the non-membrane type and includes an elongated pressure-resistive casing 96 made of rigid plastics. As best shown in FIG. 8, the cell 36 is assembled by placing, in sequence, three planar electrodes (i.e., a first lateral electrode 98, a central electrode 100 and a second lateral electrode 102) in a recess of the casing 96 with a plurality of plastic spacers 104 sandwiched therebetween, followed by fluid tightly fastening a cover 106 by screws to the casing 96. Because a pair of lateral electrodes are arranged on both side of the central electrode 100, the cell 36 of this embodiment advantageously has a double cell structure.

Each of the electrodes may be made of titanium plate coated with platinum. A terminal 108 is fixed to each of the electrodes for electrical connection to a DC power source via an electric cord. In a mode wherein alkaline water is to be produced, an electric potential is applied in such a polarity that the lateral electrodes 98 and 102 serve as the anode and the central electrode 100 acts as the cathode. In another mode wherein acidic water is to be obtained, the electric potential is applied in the opposite polarity.

Figure 9:
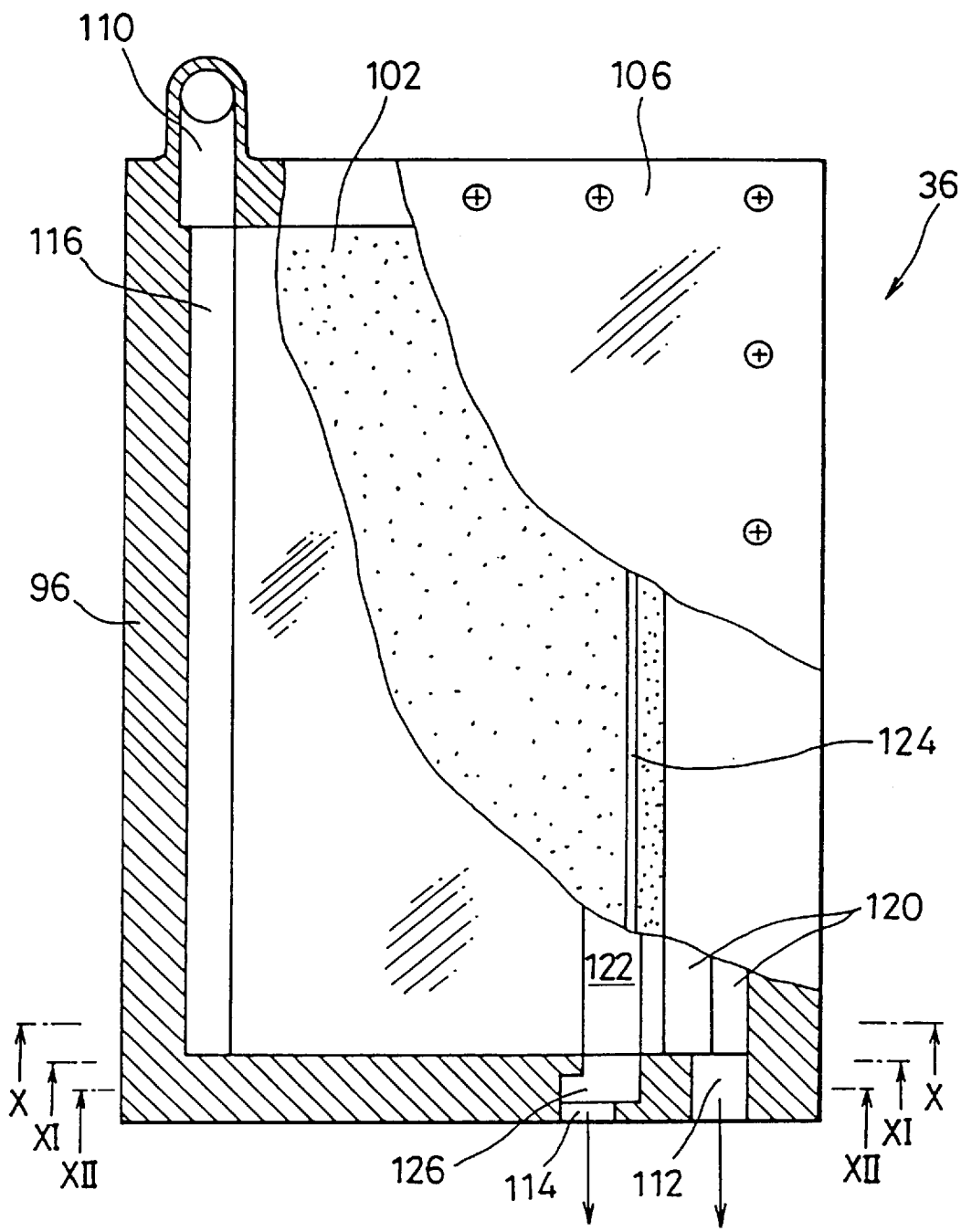
FIG. 9 is a cross-sectional view taken along the line IX—IX of FIG. 8 and showing the electrolytic cell as assembled.
Figure 10:
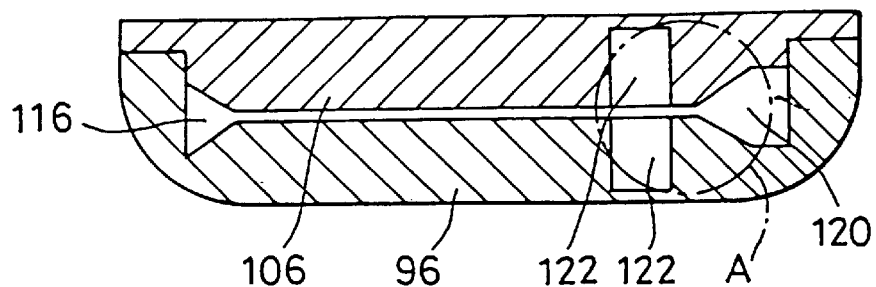
FIG. 10 is a cross-sectional view taken along the line X—X of FIG. 9, with electrodes and spacers being omitted for simplicity.
Figure 11:
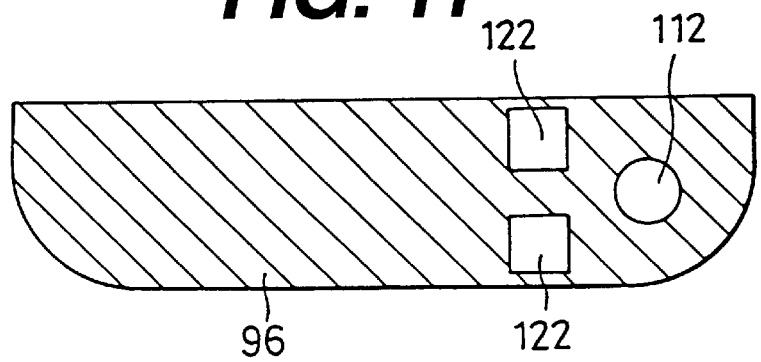
FIG. 11 is a cross-sectional view taken along the line XI—XI of FIG. 9.
Figure 12:
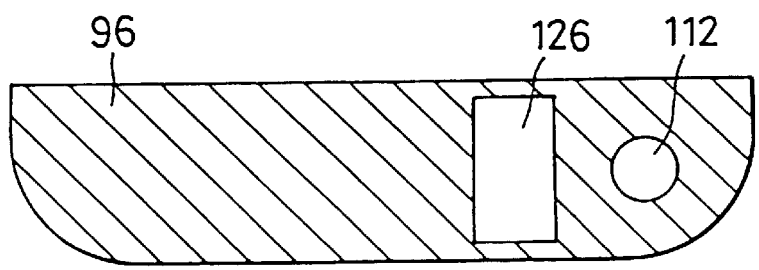
FIG. 12 is a cross-sectional view taken along the line XII—XII of FIG. 9.

As shown in FIG. 9, the casing 96 has an inlet 110 for purified water, a first outlet 112 for electrolyzed water, and a second outlet 114 for electrolyzed water, the first outlet operating as the outlet for alkaline water in the alkaline water supply mode but operating as the outlet for acidic water in the acidic water delivery mode, the second outlet serving as the outlet for acidic water in the alkaline water delivery mode but serving as the outlet for alkaline water in the acidic water delivery mode. The inlet 110 is in fluid communication with a plenum chamber or water distribution passage 116 of a generally triangular cross-section. As best shown in FIG. 10, the plenum chamber 116 is defined by the casing 96 and the cover 106 and extends throughout the entire vertical length of the electrodes.

Figure 13:
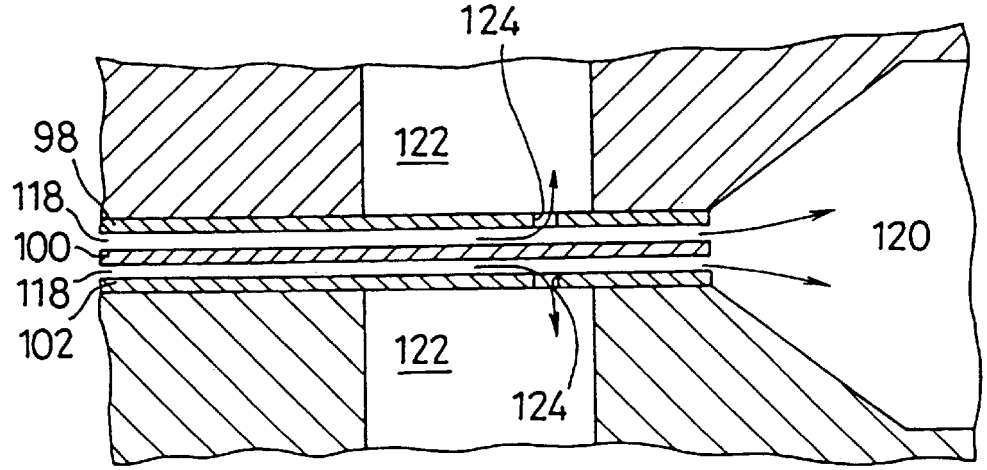
FIG. 13 is an enlarged view showing a part encircled by the circle A in FIG. 10.
Figure 14:
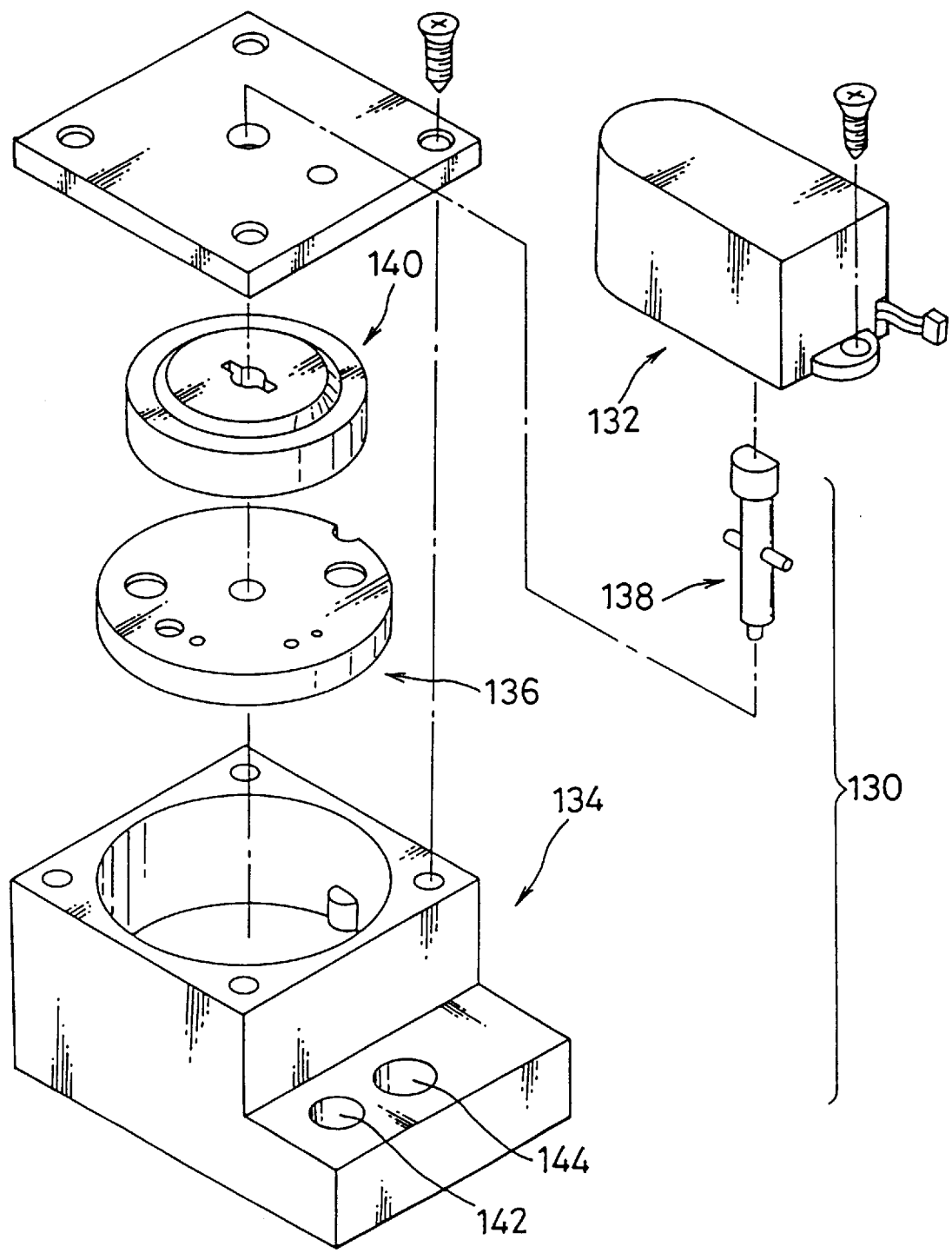
FIG. 14 is an exploded perspective view of a control valve shown in FIG. 4.
Figure 15:
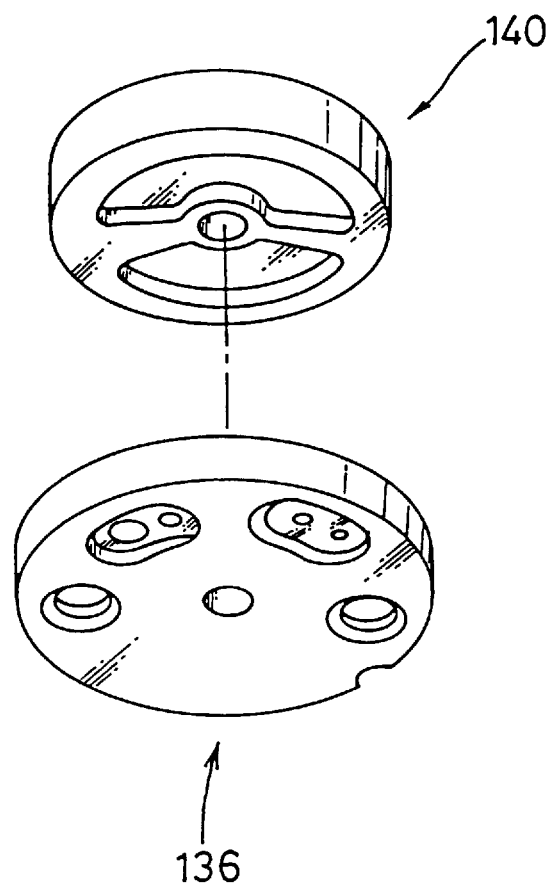
FIG. 15 is a perspective view as viewed from below showing a stationary member and a rotary disk of the control valve shown in FIG. 14.
Figure 16:
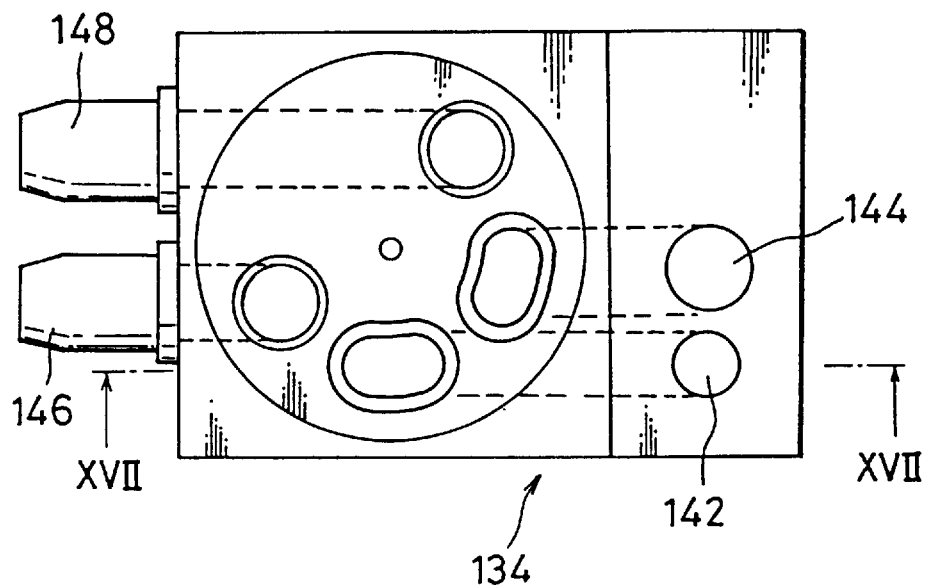
FIG. 16 is a top plan vies of a housing of the control valve shown in FIG. 14.
Figure 17:
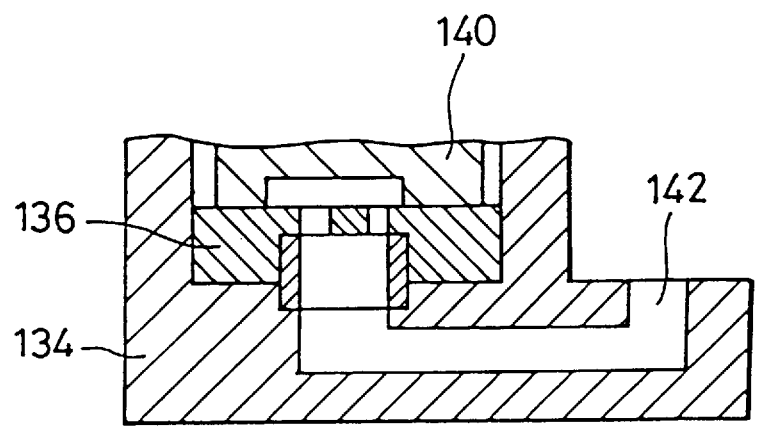
FIG. 17 is a cross-sectional view taken along the line XVII—XVII of FIG. 16.

As shown enlarged in FIG. 13, a pair of flow paths 118 are formed on both sides of the central electrode 100. Each of the flow paths concerts with the electrodes to operate as the electrolytic chamber. A plurality of horizontally extending spacers 104 are sandwiched between the electrodes to ensure that water flowing down along the plenum chamber 116 flows into the flow paths 118 in the horizontal direction as shown in FIG. 13. Since the electrode spacing is made sufficiently small, a laminar flow will be established in the flow of water flowing through the flow paths 118 in the horizontal direction. Accordingly, acidic water and alkaline water which are generated respectively along the surfaces of the electrodes by electrolysis can be recovered separately, without providing a membrane between electrodes.

Electrolyzed water produced along the surfaces of the central electrode 100 is collected in a first collection passage 120 for electrolyzed water and is delivered through the first outlet 112. The first collection passage 120 is defined by the casing 96 and the cover 106 and extends throughout the entire vertical length of the electrodes in a manner similar to the plenum chamber 116. Electrolyzed water produced along the surfaces of the lateral electrodes 98 and 102 is recovered in second collection passages 122 for electrolyzed water. To this end, each of the lateral electrodes is provided with a slit 124 to ensure that the flow of electrolyzed water flowing along the surfaces of the lateral electrodes 98 and 102 is directed to flow into the second collection passages 122. Electrolyzed water recovered in the second collection passages 122 is forwarded to a connection port 126 for delivery from the second outlet 114.

Referring again to FIG. 4, a valve unit 128 is connected to the bottom of the electrolytic cell 36 so as to control the direction of two kinds of electrolyzed water (acidic water and alkaline water) flowing out of the outlets 112 and 114 of the cell 36. The valve unit 128 may be comprised of a flow control valve 130 and an electric motor 132 with a reduction gear mechanism. An example of the flow control valve 130 is shown in FIGS. 14–17.

Referring to FIGS. 14–17, the control valve 130 includes a housing 134, a stationary member 136 positioned within the housing, and a rotary disc 140 rotated through a shaft 138 by the motor 132. The housing 134 is provided with a first inlet 142 connected to the first outlet 112 of the electrolytic cell 36, a second inlet 144 connected to the second outlet 114 of the cell 36, a serviceable water outlet 146, a drain outlet 148, and internal passages therefor. The stationary member 136 and the rotary disc 140 are formed with various ports and recesses as shown to ensure that, according to the angular position of the rotary disc 140, the entire amount of water incoming from the outlets 112 and 114 of the cell 36 is directed toward the serviceable water outlet 146 or drain outlet 148 or, alternatively, electrolyzed water issuing from the first outlet 112 of the cell 36 is forwarded to the serviceable water outlet 146 while electrolyzed water issuing from the second outlet 114 is delivered to the drain outlet 148. The serviceable water outlet 146 of the control valve 130 is connected to the delivery hose 24 and the drain outlet 148 is connected to the drain hose 30.

Referring further to FIG. 4, a control and display section 150 is provided at the base 40 of the processing unit 10. Also arranged within the base 40 is a control unit, described later, which is designed to control the electric heater 60 for regenerating the activated carbon of the processing unit 10, the electrolytic cell 36 and the motor 132 of the control valve 130. Electric power is supplied to the control unit through a cable 152 (FIG. 3).

Figure 18:
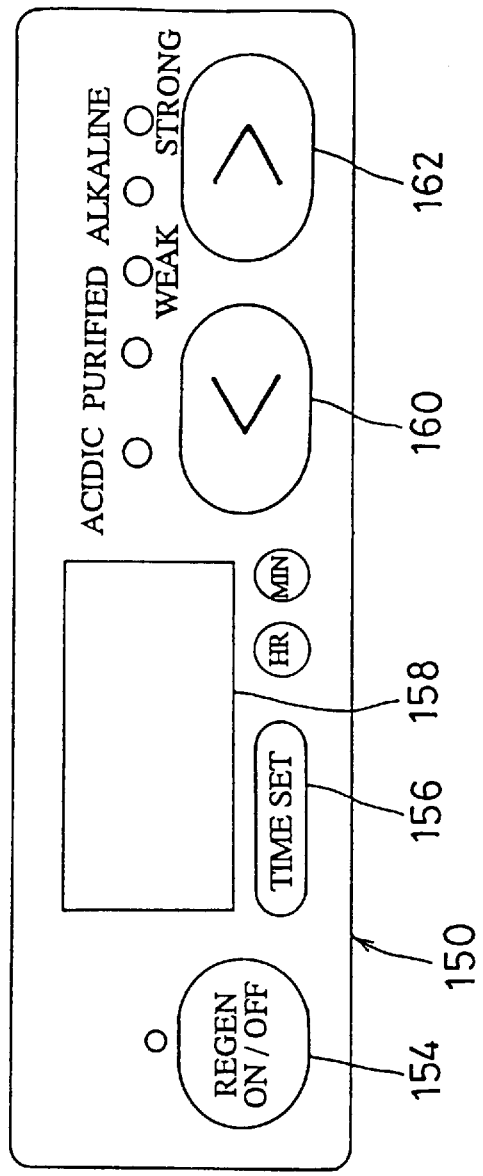
FIG. 18 illustrates an exemplary layout of a control and display panel of the water processing unit.
Figure 19:
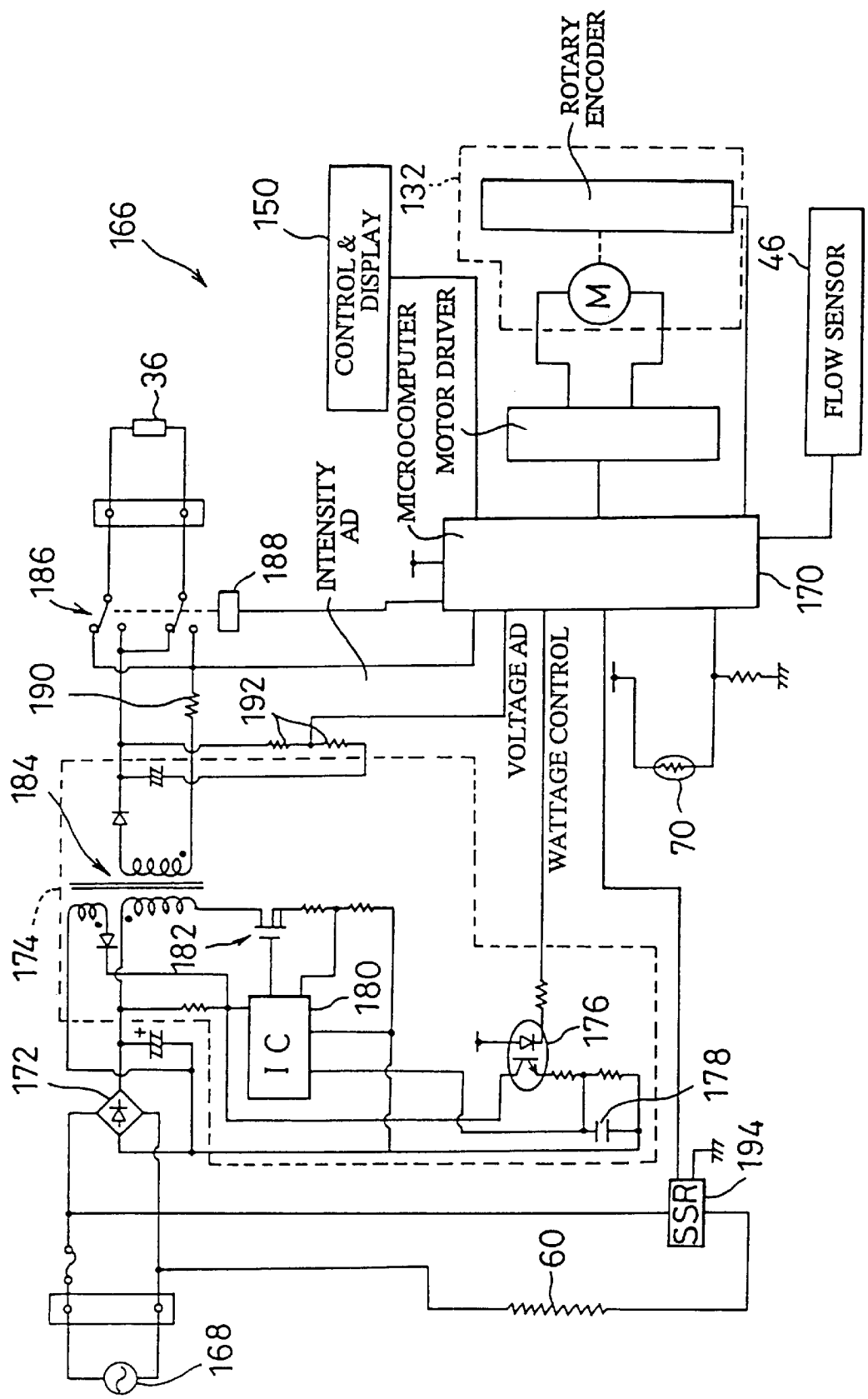
FIG. 19 is a block diagram of the control unit of the water processing unit.

An example of the layout of the control and display section 150 is shown in FIG. 18. The control and display 150 may include a manual regeneration control switch 154 for commencing regeneration of activated carbon in the cartridge 34 in accordance with the instructions of the user, a regeneration time set switch 156 for setting the time at which regeneration of activated carbon is commenced in an automatic regeneration mode, a liquid crystal display panel 158, selection switches 160 and 162 to enable the user to select the kind of water to be delivered, and light emitting diodes 164 for indicating the selected water.

In the illustrated layout, the control and display section 150 is designed such that by operating the selection switch 160 or 162 the user may select either purified water processed by the filter 32 and the activated carbon cartridge 34, or acidic or alkaline water obtained by subjecting purified water further to electrolysis. The pH of alkaline water may be adjusted in three different levels including strong, medium and weak. The arrangement may be such that, for example, weakly acidic water of pH 6.5 is obtained in the acidic water delivery mode, whereas alkaline water of pH 8.5, pH 9.0 or pH 9.5 is obtained in the alkaline water delivery mode. of the water processing unit 10. An electric power is applied to the control unit 166 from a commercial AC power source 168 via the cable 152 (FIG. 3). The control unit 166 includes a programmed microcomputer 170 which is programmed in such a manner as to control the power as well as the polarity of the direct current supplied to the electrolytic cell 36, to control the motor 132 for switching over the destination of water delivered from the cell 36, and to control the power supply to the heater 60 intended to regenerate the activated carbon cartridge 34.

The control unit 166 has a diode bridge 172 for full-wave rectifying the alternating current from the power source 168 and a switching power circuit 174. Briefly, the control unit 166 is designed and constructed such that in accordance with various operating parameters the microcomputer 170 theoretically computes the desired power consumption of the electrolytic cell 36 and that the microcomputer 170 feedback controls the switching power circuit 174 in such a manner that the power actually supplied to the cell is equal to the desired power consumption. More specifically, the switching power circuit 174 includes a photocoupler 176, a capacitor 178 for smoothing the output of the latter, an integrated circuit 180 having a pulse width modulation function, a switching transistor 182 and a switching transformer 184.

The alternating current from the commercial power source 168 is full-wave rectified by the diode bridge 172, the DC output of which is applied to the primary winding of the switching transformer 184. The pulse width of the direct current flowing the primary windings of the switching transformer 184 is controlled by the switching transistor 182 driven by the IC 180 in such a manner that an electric current having a wattage proportional to the pulse duty of the primary windings is induced in the secondary winding of the switching transformer 184. The secondary winding of the switching transformer 184 is connected to the electrodes of the electrolytic cell 36 through a reversal switch 186 designed to reverse the polarity of the voltage. The reversal switch 186 is controlled by a relay 188 which is in turn controlled by the microcomputer 170.

A resistor 190 for detecting the intensity of current flowing through the cell is connected in series to the lead wires connecting the cell 36 and the switching transformer 184, and a pair of resistors 192 for detecting the voltage applied to the cell are connected in parallel to the lead wires. The junctions to these resistors 190 and 192 are connected to input terminals of analog-to-digital converter of the microcomputer to ensure that the microcomputer 170 periodically checks the potential at these junctions to detect the intensity and the voltage of electric current supplied to the electrolytic cell.

The control unit 166 further includes a solid state relay (SSR) 194 for controlling power supply to the heater 60 for regenerating activated carbon, the relay being adapted to be controlled by the microcomputer 170. The output signals of the thermistor 70 and the flow-rate sensor 46 are sent to the microcomputer 170. The microcomputer 170 further controls the geared motor 132 through a motor driver. A rotary encoder incorporated in the motor detects the rotational angular position of the motor and delivers a corresponding signal to the microcomputer 170. The microcomputer 170 controls the motor in accordance with the signals from the rotary encoder to, in turn, control the rotary control valve 130 whereby the destination of two kinds of electrolyzed water (acidic water and alkaline water) flowing out of the outlets 112 and 114 of the cell 36 is changed over.

The mode of operation as well as the mode of use of the water processing unit 10 will now be described with reference to the operation of the microcomputer 170 illustrated in the flowcharts of FIGS. 20–23. Briefly, in the example shown in the flowcharts, the microcomputer 170 is programmed such that electric power is supplied to the heater 60 to heat the cartridge 34 to thereby sterilize by boiling and to regenerate the activated carbon everyday automatically whenever the predetermined time which is preset by the user for regeneration of activated carbon has arrived, as well as each time the user has pressed on the manual regeneration start switch. The time for activated carbon regeneration is set in such a manner that, upon connecting the plug of the cable 152 into an associated electrical socket, the time is set by default for 13 hours later, for example, and the preset time is incremented on the one hour basis each time the user presses on the regeneration time set switch 156. It is recommended that the activated carbon regeneration time is set for midnight in which it is unlikely that the water processing unit is used.

According to the invention, the microcomputer 170 is also programmed such that, prior to the commencement of regeneration of the activated carbon, and when water is fed for the first time in the following morning, an electric potential of a polarity opposite to that of the immediately preceding electrolysis is applied between the electrodes 100 and 98/102 of the cell 36 to remove, by way of the so-called reverse potential descaling, the scale such as calcium carbonate precipitated on the electrodes. In the example shown in the flowcharts, the program is such that the reverse potential descaling is carried out for about 5 minutes before regeneration of the activated carbon is commenced in midnight and for about 30 seconds at the time when water is fed for the first time in the following morning.

Figure 20A:
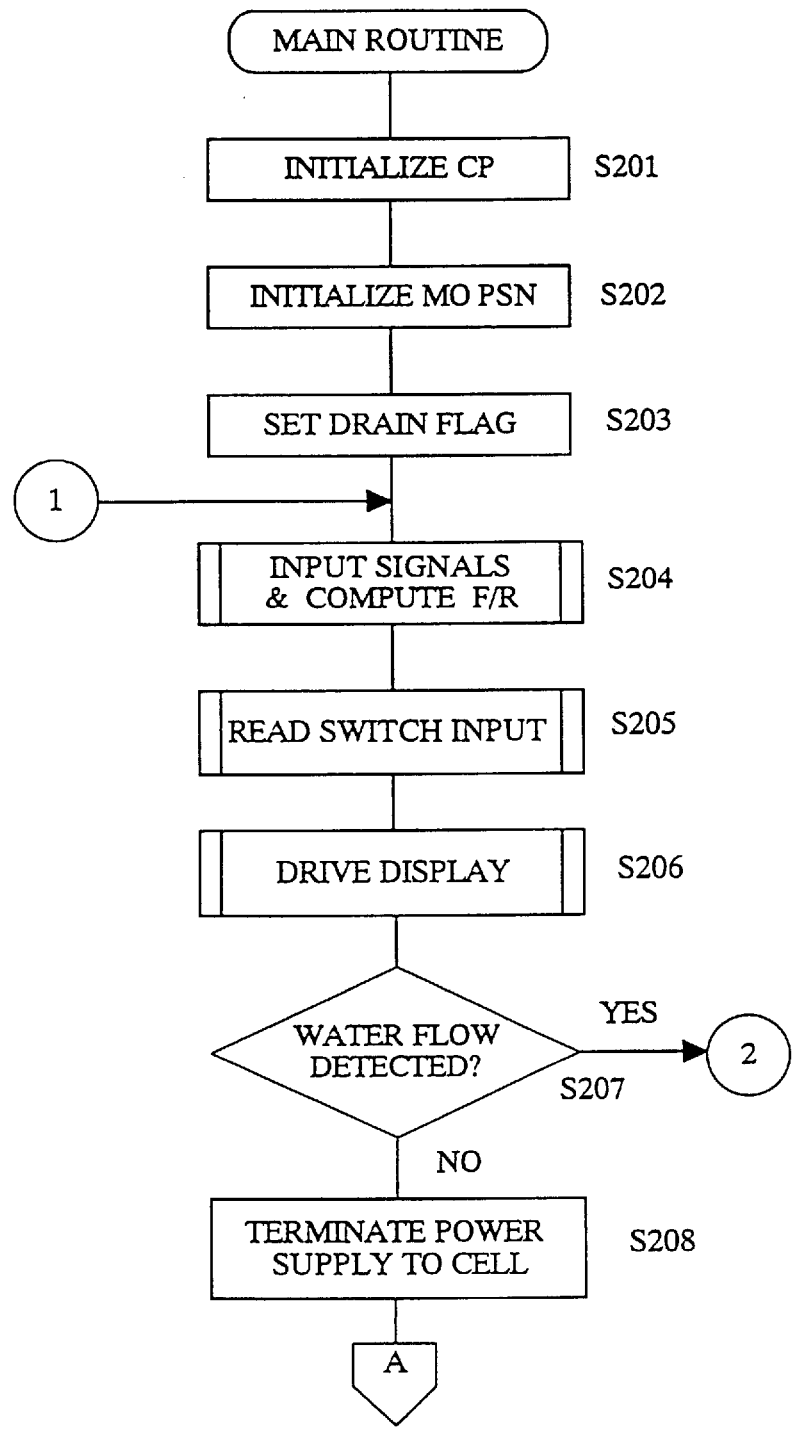
FIGS. 20A–20C are flowcharts showing the main routine of the control unit shown in FIG. 19.

More specifically, referring to the flowcharts shown in FIG. 20A and ensuing drawings, upon engaging the cable plug with the socket, the microcomputer 170 is initialized (S201) and the motor 132 is returned to its initial position in which two outlets 112 and 114 of the electrolytic cell 36 are connected to the drain hose 30 (S202). In the microcomputer initializing sequence (S201), a "regeneration flag" indicative of a demand for activated carbon regeneration (see S209) is reset to "0". In this regard, the regeneration flag as well as various other flags, counters and timers described later may be implemented by the microcomputer 170 and its associated memories. A "drain flag" is then set to "1" (S203). The drain flag "1" is intended to mean a demand that water be discarded while the drain flag "0" indicates that water need not be discarded.

Then, the output of the thermistor 70 is input and the flow rate is computed based on the signal from the flow rate sensor 46 (S204), followed by reading of the switch inputs of the control and display section 150 (S205) and energization of the display panel (S206).

When water flow is detected (S207) in response to the mixing valve 16 being opened so as to feed water to the processing unit 10 for the first time after connection of the cable plug, the drain flag is checked (S219). As the drain flag has been set to "1" at S203 as mentioned before, a sub-routine sequence for "reverse potential descaling" of electrodes is carried out upon commencement of water feed (S220).

Figure 20B:
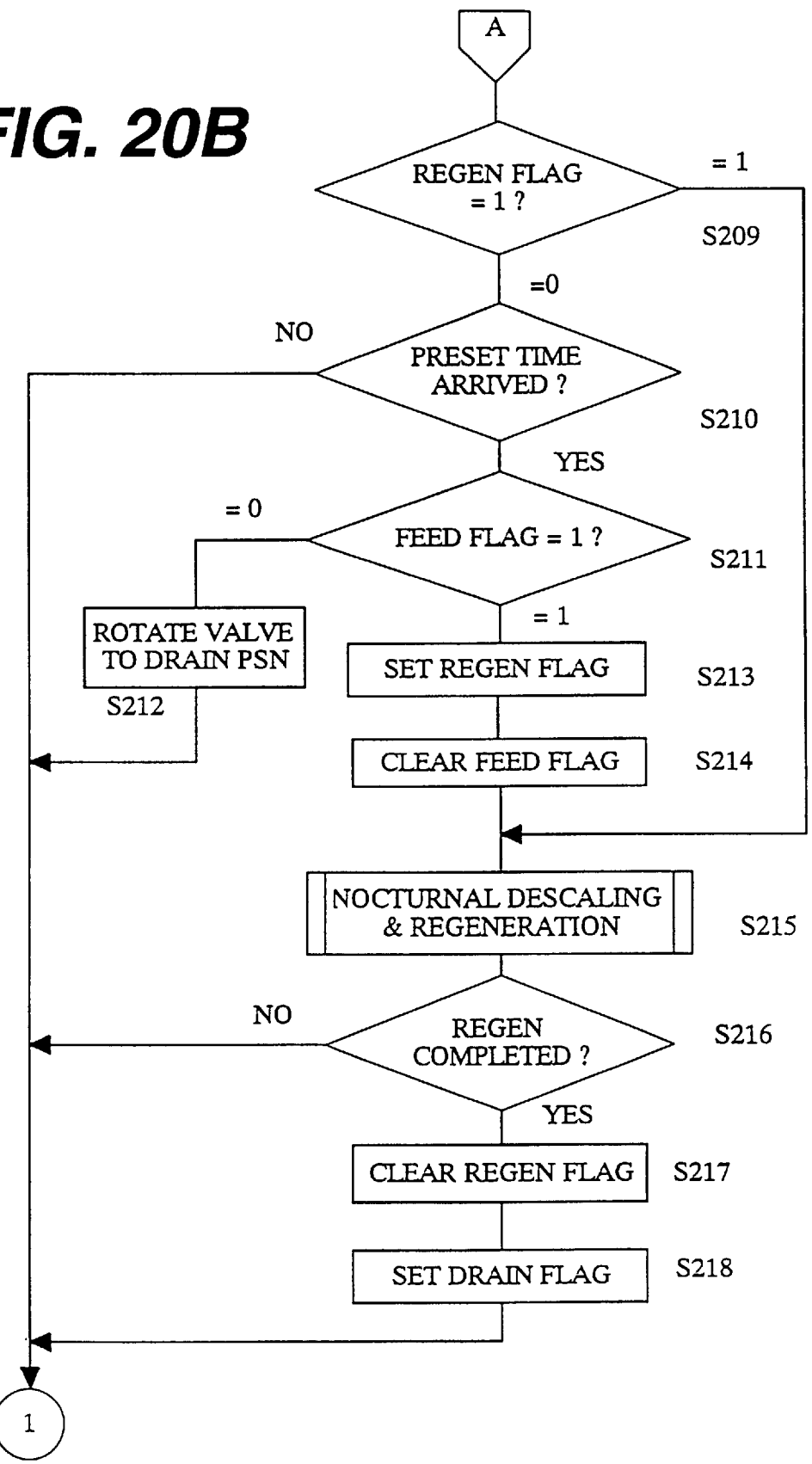
Figure 20C:
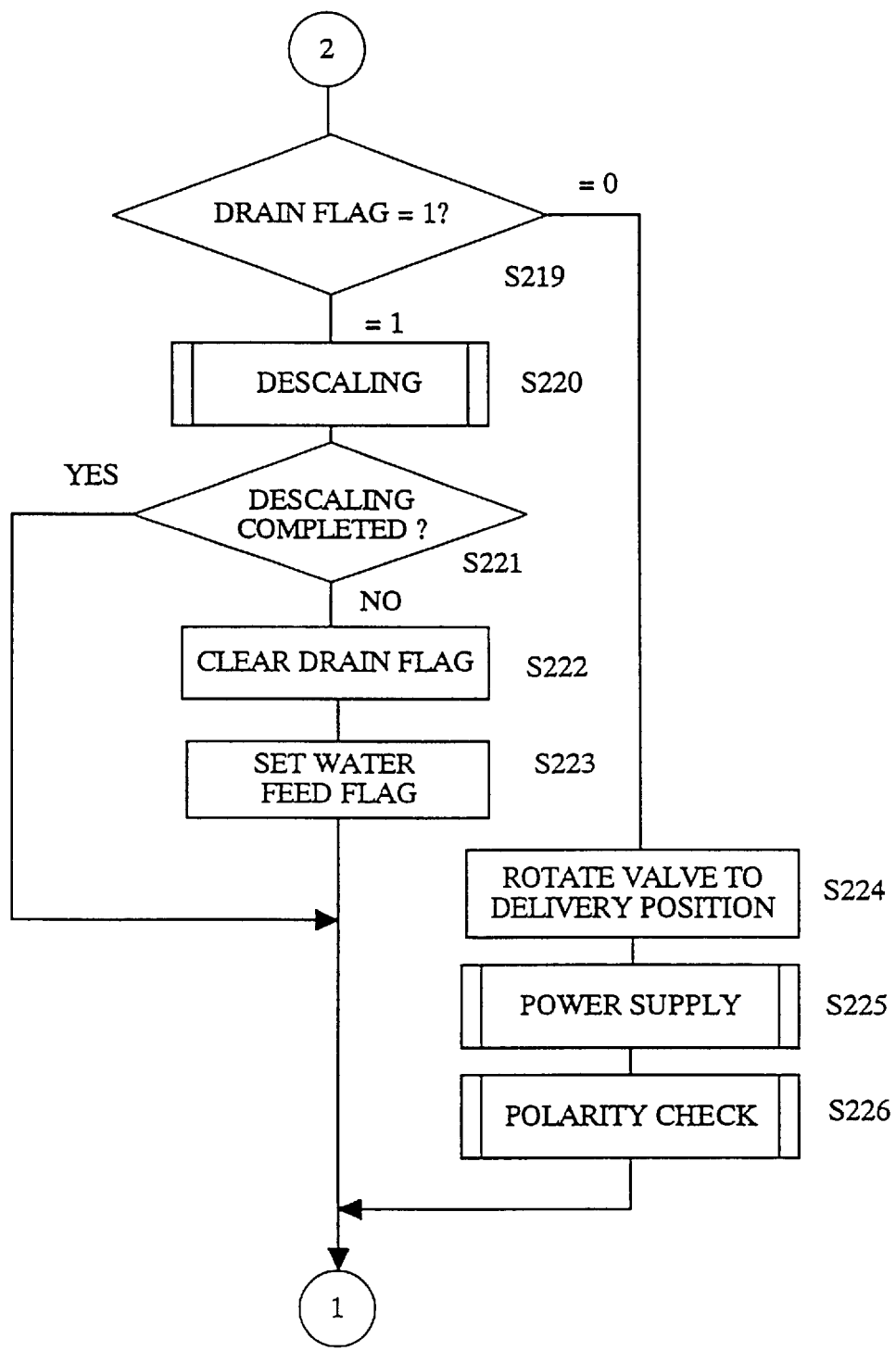
Figure 22:
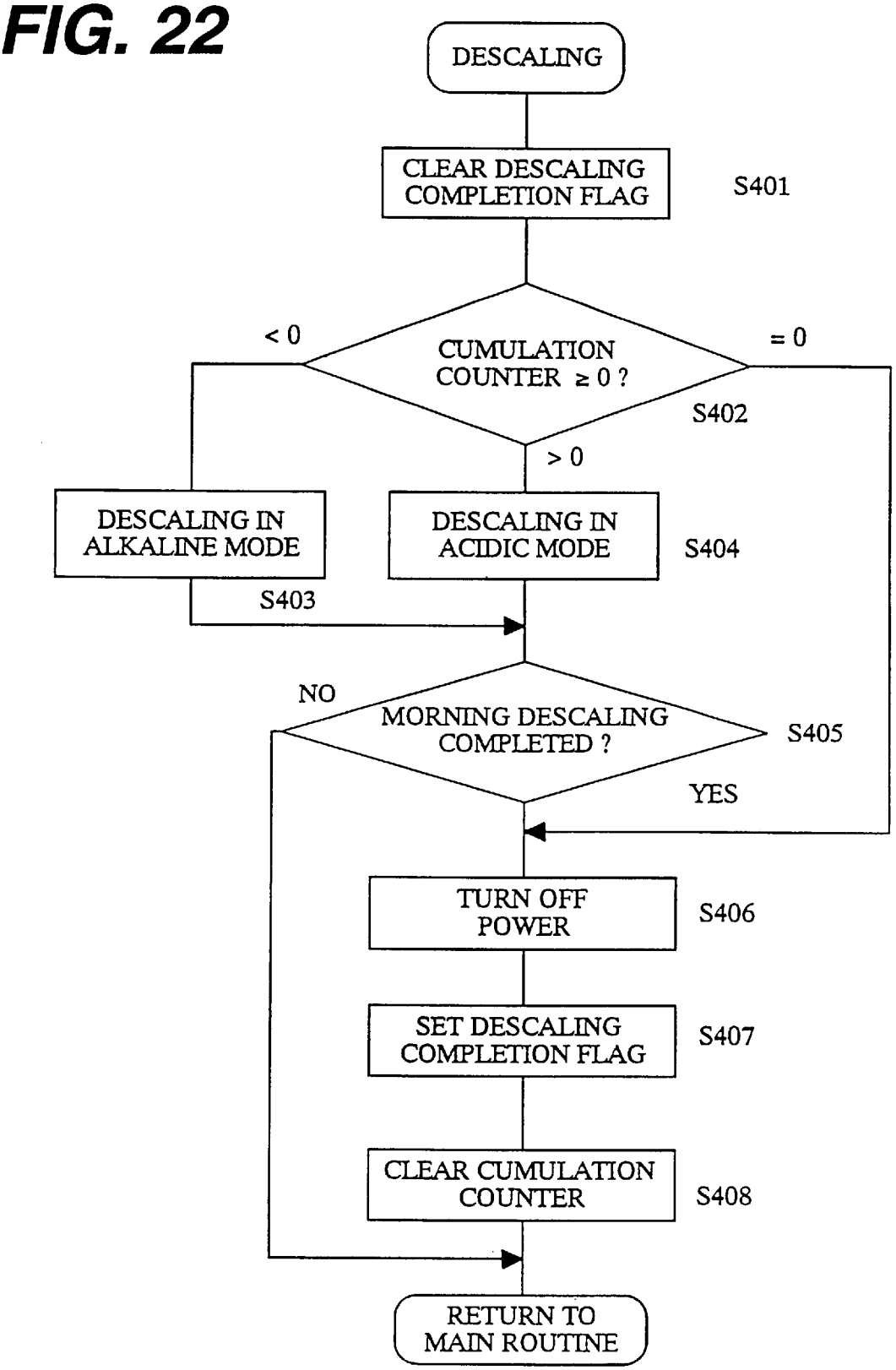
FIG. 22 is a flowchart showing a sub-routine for the reverse potential descaling of the electrodes.

The detail of the reverse potential descaling sub-routine is shown in the flowchart of FIG. 22. Referring to FIG. 22, after a descaling completion flag which indicates completion of reverse potential descaling of electrodes is cleared (S401), a cumulation counter is checked (S402). In this regard, the cumulation counter is intended to sum the duration of electrolysis (i.e., the time period of power supply to the electrodes of the cell) while countervailing the duration of electrolysis performed in opposite polarity and is operable to be incremented in the alkaline water delivery mode but to be decremented in the acidic water delivery mode as will be described later in more detail with reference to the flowchart of FIG. 23. As the sum of the cumulation counter will be zero at the time of first water feed after connection of the cable plug, power supply to the electrolytic cell 36 is kept turned off (S406). After the descaling completion flag is set (S407) and the cumulation counter is cleared (S408), the main routine shown in FIGS. 20A–20C is continued.

In the main routine, the descaling completion flag is checked (S221). As this flag has previously been set at S407, the drain flag is then cleared (S222) and a "water feed flag" is set (S223). The water feed flag indicates whether water has ever been fed to the water processing unit after the previous regeneration of the activated carbon up to the present time and is intended to ensure that, in the event that water was not fed after the previous regeneration to present, regeneration of the activated carbon be skipped or passed as described later even if the activated carbon regeneration time has arrived.

Then, S204 and following tasks are again repeated to go from S207 to S219. As the drain flag has previously been cleared at S222, the motor 132 is then driven until the control valve 130 is rotated to the water delivery position (S224) whereby the first outlet 112 of the electrolytic cell 36 is connected to the water delivery hose 24. Then, an electric potential is applied between the electrodes of the cell 36 in a given polarity which corresponds to the user's selection (S225).

In the alkaline water delivery mode wherein the user has selected "alkaline water", an electric current of a predetermined power is applied to the electrolytic cell 36 in such a polarity that the central electrode 100 functions as the cathode and the lateral electrodes 98 and 102 serve as the anode. As a result, alkaline water is generated along the surfaces of the cathode and is forwarded to the first outlet 112 of the cell 36, with acidic water being produced along the surfaces of the anodes and forwarded to the second outlet 114. The power supply to the cell 36 is controlled by the microcomputer 170 such that water of the desired pH (e.g., pH 8.5, pH 9.0 or pH 9.5) selected by the user is obtained. Alkaline water thus produced is sent via the delivery hose 24 to the faucet spout whereas acidic water is discarded into the sink through the drain hose 30.

The embodiment shown is so designed that acidic water produced is discarded through the drain hose 30 into the sink. It will be noted, however, that in the alkaline water delivery mode, strongly acidic water containing hypochlorous acid and chlorine gas is generated along the surfaces of the anodes 98 and 102 upon electrolysis of sodium chloride contained in tap water. Strongly acidic water containing hypochlorous acid and chlorine gas will similarly be produced if sodium chloride is added to incoming water. Such strongly acidic water sent to the drain hose 30 is bactericidal and may be recovered from hose 30 for use as germicidal water.

When the user has selected "acidic water", the relay 188 is energized to switch over the reversal switch 186 so that an electric power is supplied to the cell 36 in such a polarity that the central electrode 100 acts as the anode and the lateral electrodes 98 and 102 serve as the cathode. Accordingly, acidic water is obtained at the first outlet 112 of the cell 36 and alkaline water is delivered from the second outlet 114. Acidic water is sent to the delivery hose 24 but alkaline water is forwarded to the drain hose 30.

Figure 23:
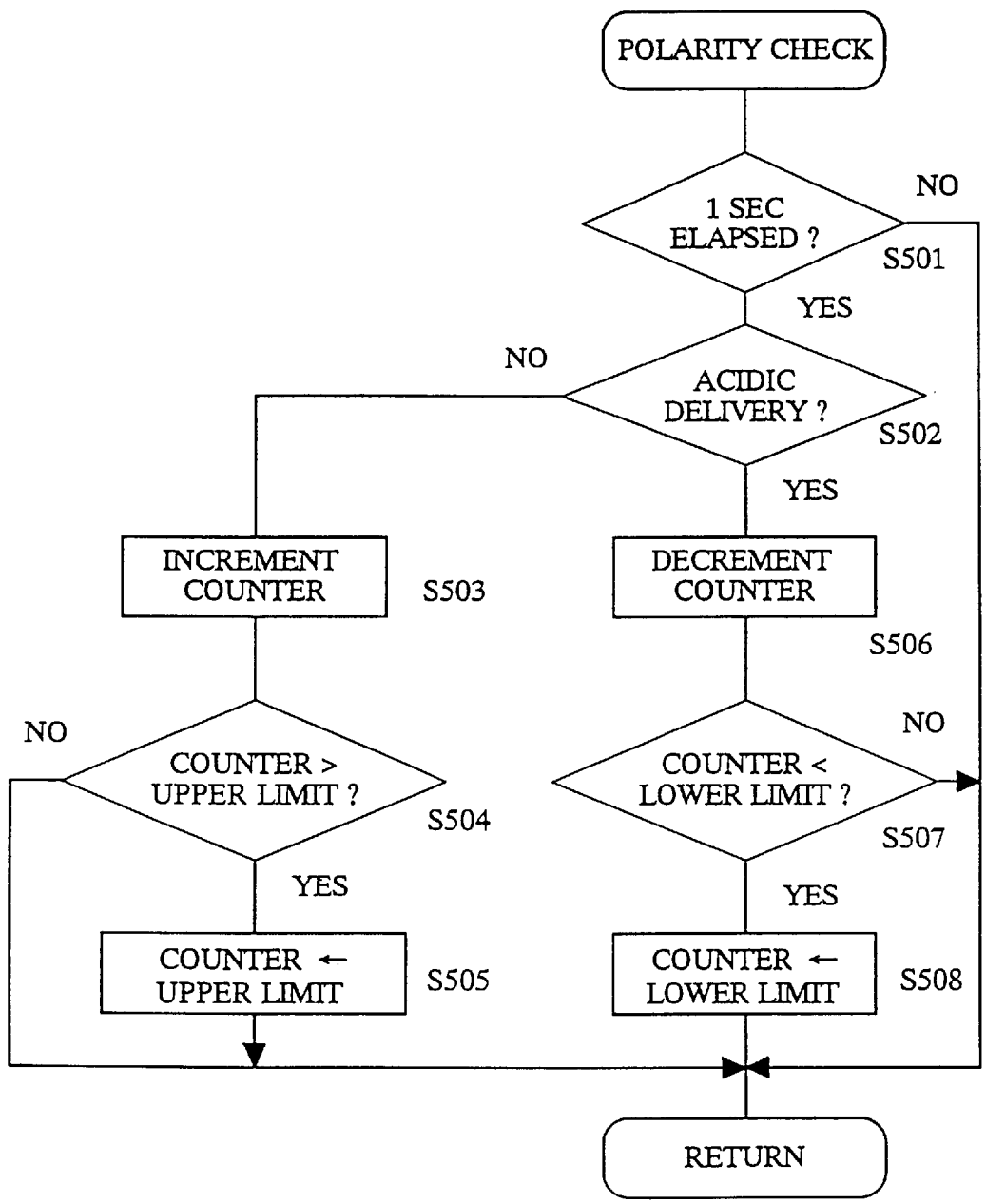
FIG. 23 is a flowchart showing a sub-routine for checking the electrode polarity; and, FIG. 24 is a diagram showing the manner in which a cumulation counter is incremented or decremented.
Figure 24:
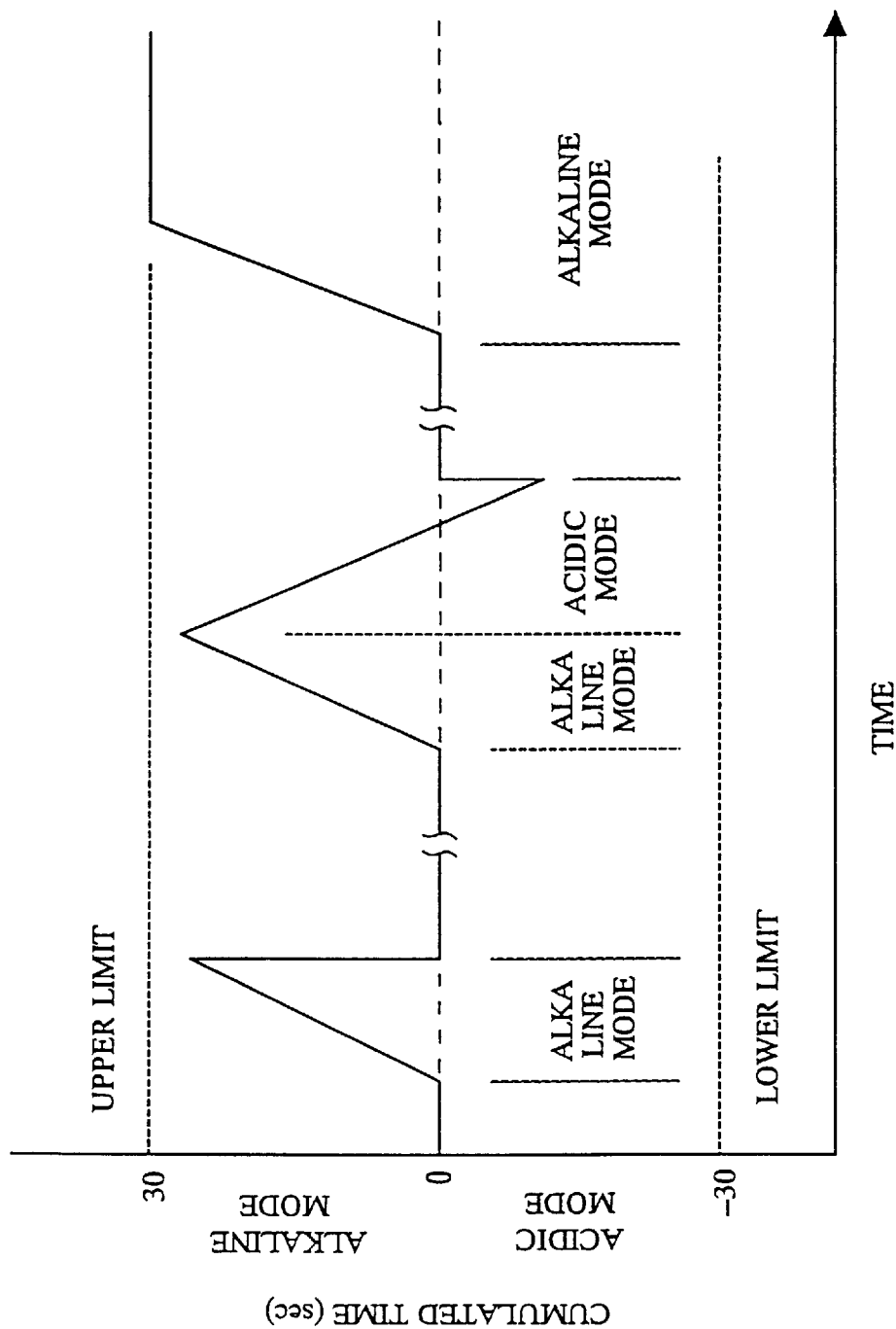

As long as the electrolytic cell 36 is operated, a "polarity check" sub-routine (S226) is performed. Thus, as shown in the flowchart of FIG. 23, whether the mode of delivery is for alkaline or acidic water is checked every minute (S501–S502). In case of the alkaline water delivery mode, the cumulation counter is incremented on the one second basis (S503). However, an upper limit is set for the cumulation counter (S504–S505), the upper limit being of 30 seconds in the embodiment shown. On the contrary, in the case of acidic water delivery mode, the cumulation counter is decremented on the one second basis (S506) and the lower limit of the counter is similarly set for 30 seconds (S507–S508). Referring by way of an example to FIG. 24, if the cell is operated, for example, in the alkaline water supply mode, the sum of the cumulation counter will be incremented every second (the left part of FIG. 24). If alkaline water delivery mode is followed by acidic water delivery mode performed for a longer period, the sum of the cumulation counter will be countervailed so that the sum will become a minus value (the central part of FIG. 24). When alkaline water supply mode is continued for a period of more than 30 seconds, the sum of the cumulation counter will be limited to the upper limit of 30 seconds (the right part of FIG. 24).

When the use of the water processing unit is terminated and water feed thereto is stopped (S207), power supply to the electrolytic cell will be terminated (S208). After the use of the processing unit for a given day has ended in this manner and upon arrival of the activated carbon regeneration time which has been preset for midnight by the regeneration time set switch of the control board 150 (S210), the water feed flag is determined (S211). The water feed flag, which is adapted to be set as water is fed to the unit (see S223), is checked to ensure that, in the event that no water has been fed to the cartridge 34 after connection of the cable plug or after completion of the previous regeneration of activated carbon, the activated carbon regeneration is skipped or passed in order to avoid that the cartridge 34 void of water is inadvertently heated. If water feed has been made, the regeneration flag is set (S213) and the water feed flag is cleared (S214) and the sub-routine for the reverse potential descaling of the electrodes of the cell and the regeneration of the activated carbon is commenced (S215).

Figure 21A:
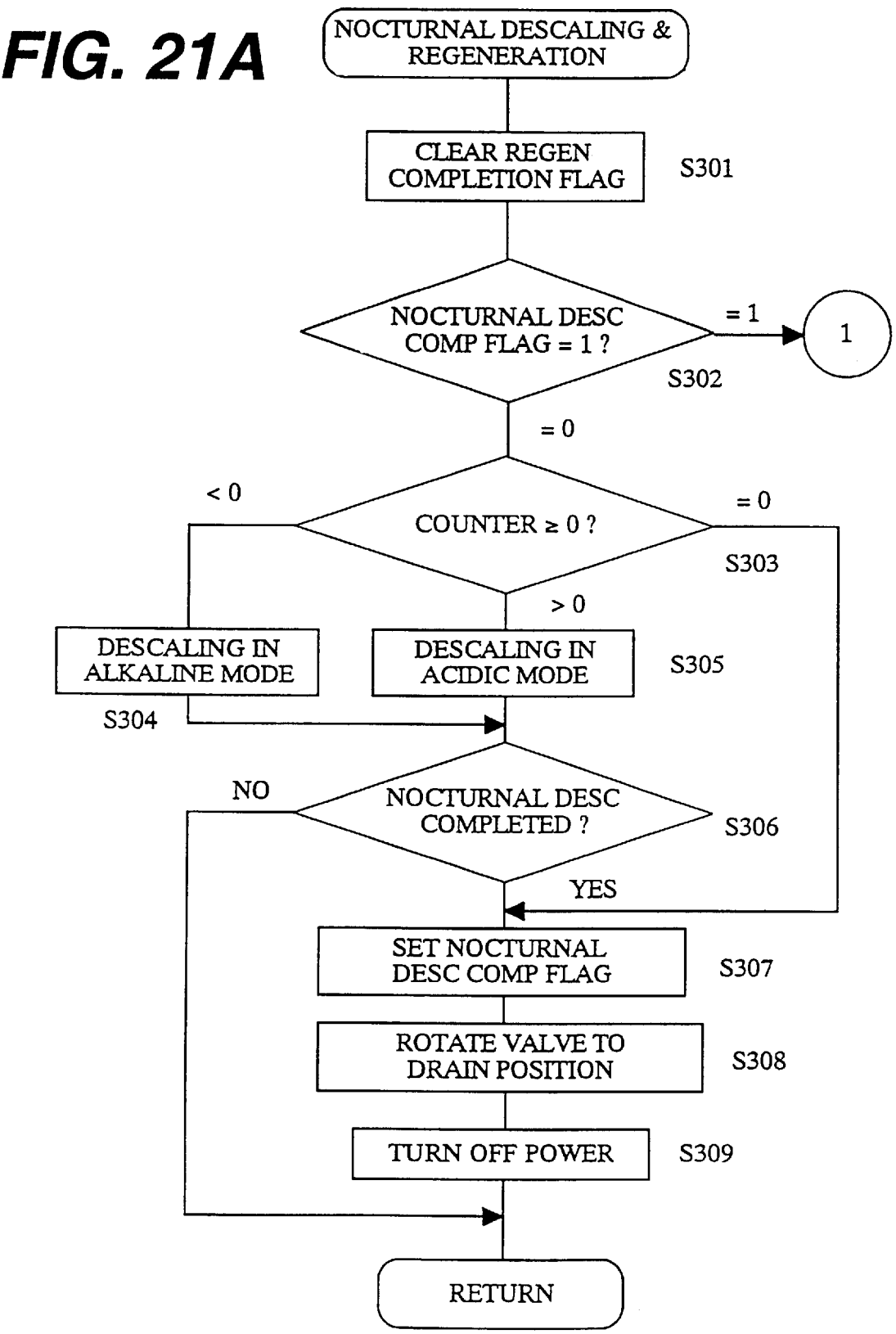
FIGS. 21A and 21B are flowcharts showing a sub-routine for nocturnal reverse potential descaling and activated carbon regeneration.
Figure 21B:
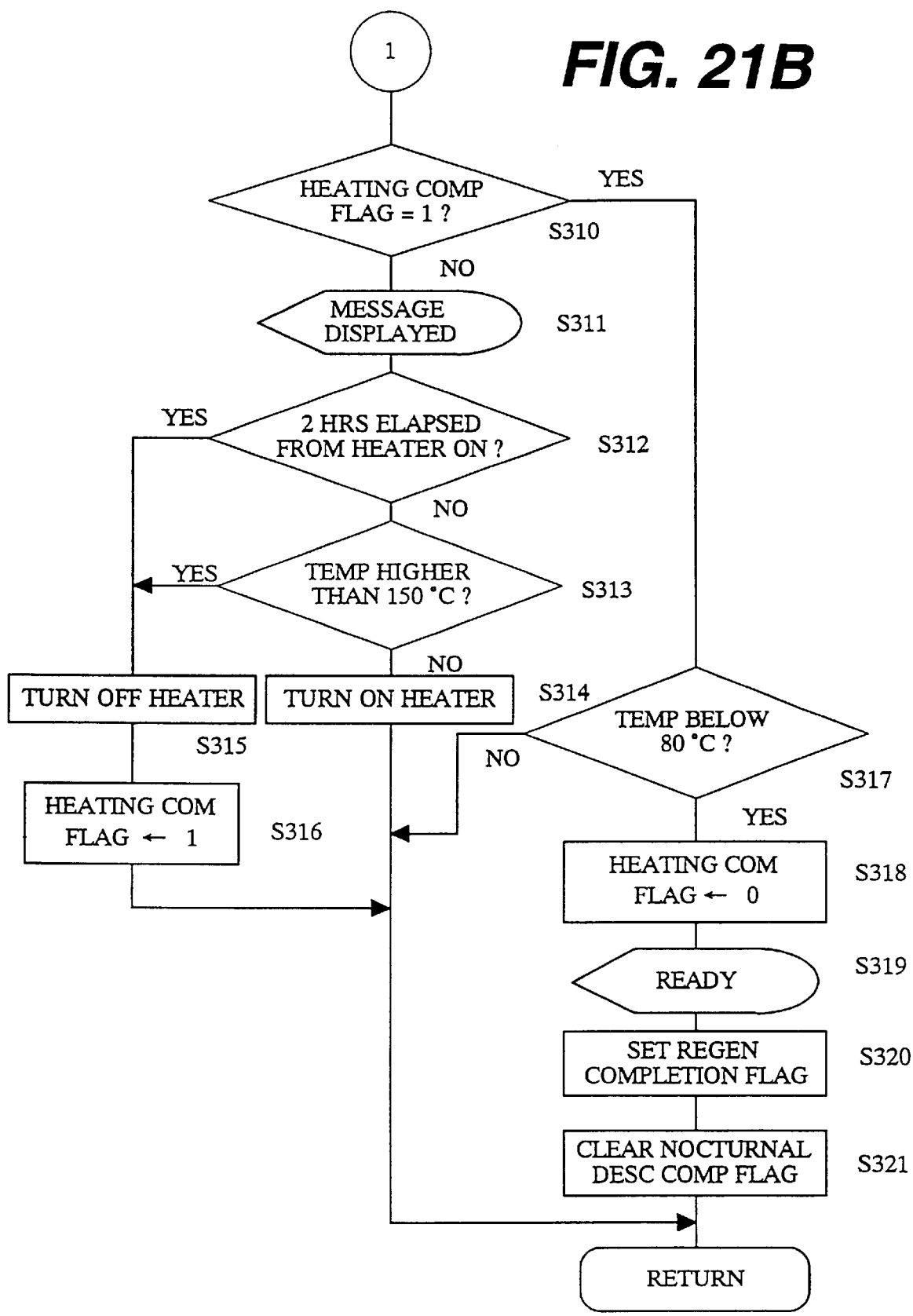

Referring to the flowcharts shown in FIGS. 21A and 21B, in the reverse potential descaling and regeneration sub-routine, a regeneration completion flag indicative of the completion of regeneration of activated carbon is cleared (S301), the descaling completion flag is then checked (S302) and the cumulation counter is inspected (S303). In the case where the sum of the cumulation counter is zero, the reverse potential descaling will not be performed in consideration of the fact that, because the alkaline water delivery mode and the acidic water delivery mode have been alternately performed for an equal period of time, the scales such as calcium carbonate which might have precipitated on the electrodes have already been removed. If the sum of the cumulation counter is less than zero, meaning that the acidic water supply mode has been performed for a longer period than the alkaline water supply mode, the descaling is carried out in the alkaline water delivery mode in such a manner that an electric potential of the opposite polarity is applied between the electrodes (S304). If, conversely, the sum of the cumulation counter is larger than zero, meaning that the alkaline water supply mode has been performed for a longer period than the acidic water supply mode, an electric potential of the opposite polarity is applied between the electrodes (S305). The reverse polarity descaling of the electrodes may be carried out, for example, for about 5 minutes (S306). When the reverse polarity descaling is completed in this manner for 5 minutes in midnight when the water processing unit is not in use, the descaling completion flag is set (S307) and the control valve 130 is then rotated to the drain position (S308) and the power output to the electrolytic cell is terminated (S309).

Since the descaling completion flag has been set as aforementioned, during the course of the next routine, a heating completion flag is checked (S310) after the decision at S302, whereupon a warning message reading, for example, as "under regeneration" or "under preparation" is displayed on the display panel 158 (S311) to preclude the user from inadvertently using the water processing unit. Then, the SSR 194 is energized to commence electric power supply to the heater 60 (S314). Power supply to the heater 60 is continued either until two hours elapses (S312) or the temperature of the cartridge 34 becomes higher than 150° C.

Upon operation of the heater 60, the activated carbon cartridge 34 is heated causing water in the cartridge 34 to boil. Under the action of hot water and steam, the activated carbon in the cartridge is sterilized by boiling and chlorine ions and volatile substances such as trihalomethanes which have been adsorbed by the activated carbon are desorbed from the activated carbon whereby the activated carbon is regenerated. As the heater 60 is operated, the wax element of the temperature-sensitive direction control valve 78 expands to switch over the valve 78 whereby hot water and steam generated in the cartridge 34 are discharged through the drain hoses 30 and 92 into the sink.

Regeneration of the activated carbon will be completed when water contained in the cartridge 34 and water impregnated in the activated carbon are depleted by evaporation, whereupon the temperature of the cartridge 34 will begin to rise. As soon as the temperature as detected by the output signal of the thermistor 70 has exceeded, say, 150° C. (S313), power supply to the heater 60 is terminated (S315) and the heating completion flag is set for "1" (S316) to ensure that the temperature monitoring sequence is switched over in such a manner that cooling of the cartridge can be monitored. As the temperature of the cartridge 34 becomes lower than 80° C. (S317), the heating completion flag is reset (S318), a "ready" message is displayed (S319), the regeneration completion flag indicative of the completion of regeneration of activated carbon is set (S320), and the flag indicating completion of the reverse potential descaling is cleared (S321).

Upon completion of the regeneration of activated carbon (S216), the regeneration flag is cleared (S217) and the drain flag is set (S218). Accordingly, when water is fed for the first time in the morning of the next day (S207), sequence S220 is proceeded after task S219 whereby the reverse potential descaling of the electrodes is carried out. Descaling performed for the first time in the morning may be continued for 30 seconds (S405). Upon completion of the morning descaling, the drain flag is cleared (S222) so that the control valve 130 is rotated to the water delivery position (S224). In this manner, whenever the water processing unit is operated for the first time in the morning, the electrolytic cell will be placed in a usable condition after the reverse potential descaling has automatically been carried out for 30 seconds while issuing water is discarded and drained. Thereafter, an electric power is supplied to the cell electrodes in accordance with the kinds of ion enriched water selected by the user and the summation of the cumulation counter is then restarted for the particular day (S226).

While the present invention has been described herein with reference to the specific embodiments thereof, it is contemplated that the invention is not limited thereby. For example, although the water electrolyzer according to the invention has been described as being incorporated in the water processing unit 10 equipped with the filtration stage 32 and the activated carbon cartridge 34, the filtration stage 32 and the activated carbon cartridge 34 may be omitted and the water electrolyzer alone may be used. Furthermore, while the strongly acidic water generated in the alkaline water delivery mode has been described as being discarded into the sink, it may be recovered for use as germicidal water. The cycle and frequency of the reverse potential application may be altered as required.

I claim:

1. In a water electrolyzer having a non-membrane electrolytic cell provided with a pair of electrodes, a source of DC potential, and a control device for applying between said electrodes a DC operating potential from said source in a desired polarity to produce alkaline or acidic water; the improvement wherein said control device comprises means for monitoring a duration of electrolysis in an alkaline water supply mode and a duration of electrolysis in an acidic water supply mode so as to detect which of the alkaline water supply mode and the acidic water supply mode has a longer duration; and control means for applying between said electrodes a DC descaling potential at descaling intervals, for a descaling period of time, said DC descaling potential having a polarity opposite to the polarity of the electrolysis mode used for the longer duration.

2. A water electrolyzer according to claim 1, wherein said control device includes means for applying the DC operating potential for at least about 10 seconds.

3. A water electrolyzer according to claim 2, wherein said control device includes means for applying the DC operating potential for about 30 seconds.

4. A water electrolyzer according to claim 3, wherein said control means includes means for applying the DC descaling potential for said descaling period of time in a range of from about 10 seconds to about 10 minutes.

5. A water electrolyzer according to claim 4, wherein said control means includes means for applying the DC descaling potential for said descaling period of time of about 30 seconds.

6. A water electrolyzer according to claim 3, wherein said control means includes means for applying the DC descaling potential at said descaling intervals of about one day.

7. A water electrolyzer according to claim 2, wherein said control means includes means for applying the DC descaling potential for said descaling period of time in a range of from about 10 seconds to about 10 minutes.

8. A water electrolyzer according to claim 7, wherein said control means includes means for applying the DC descaling potential for said descaling period of time of about 30 seconds.

9. A water electrolyzer according to claim 2, wherein said control means includes means for applying the DC descaling potential at said descaling intervals of about one day.

10. A water electrolyzer according to claim 1, wherein said control means includes means for applying the DC descaling potential for said descaling period of time in a range of from about 10 seconds to about 10 minutes.

11. A water electrolyzer according to claim 10, wherein said control means includes means for applying the DC descaling potential for said descaling period of time of about 30 seconds.

12. A water electrolyzer according to claim 11, wherein said control means includes means for applying the DC descaling potential at said descaling intervals of about one day.

13. A water electrolyzer according to claim 10, wherein said control means includes means for applying the DC descaling potential at said descaling intervals of about one day.

14. A water electrolyzer according to claim 1, wherein said control means includes means for applying the DC descaling potential at said descaling intervals of about one day.

15. A water electrolyzer according to claim 6, wherein the control means includes means for applying the DC descaling potential every morning when water is fed for the first time.

16. A water electrolyzer according to claim 6, wherein the control means includes means for applying the DC descaling potential every night.

* * * * *

UNITED STATES PATENT AND TRADEMARK OFFICE
CERTIFICATE OF CORRECTION

PATENT NO. : 5,846,390
DATED : December 8, 1998
INVENTOR(S) : Toshio EKI, et al.

It is certified that error appears in the above-identified patent and that said Letters Patent is hereby corrected as shown below:

Claim 15, column 16, line 9, "6" should read --14--.

Claim 16, column 16, line 12, "6" should read --14--.

Signed and Sealed this

Seventeenth Day of August, 1999

Attest:

Attesting Officer

Q. TODD DICKINSON

Acting Commissioner of Patents and Trademarks